US008823829B2

(12) United States Patent
Imai

(10) Patent No.: US 8,823,829 B2
(45) Date of Patent: Sep. 2, 2014

(54) IMAGE CAPTURE WITH ADJUSTMENT OF IMAGING PROPERTIES AT TRANSITIONS BETWEEN REGIONS

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 12/884,153

(22) Filed: Sep. 16, 2010

(65) Prior Publication Data

US 2012/0069212 A1 Mar. 22, 2012

(51) Int. Cl.
*H04N 9/73* (2006.01)

(52) U.S. Cl.
USPC ................ 348/223.1; 348/222.1; 348/362

(58) Field of Classification Search
None
See application file for complete search history.

(56) References Cited

U.S. PATENT DOCUMENTS

| | | | | |
|---|---|---|---|---|
| 6,362,829 | B1* | 3/2002 | Omvik et al. | 345/593 |
| 6,388,709 | B1* | 5/2002 | Kobayashi et al. | 348/362 |
| 6,466,961 | B1 | 10/2002 | Miller | 708/816 |
| 7,034,881 | B1* | 4/2006 | Hyodo et al. | 348/333.12 |
| 8,031,243 | B2* | 10/2011 | Imai et al. | 348/278 |
| 8,237,809 | B2* | 8/2012 | Mertens | 348/222.1 |
| 8,665,355 | B2* | 3/2014 | Imai | 348/333.02 |
| 2002/0012064 | A1* | 1/2002 | Yamaguchi | 348/362 |
| 2003/0098922 | A1* | 5/2003 | Barkan | 348/362 |
| 2005/0270397 | A1* | 12/2005 | Battles | 348/333.01 |
| 2007/0015301 | A1* | 1/2007 | Wen et al. | 438/48 |
| 2007/0248349 | A1* | 10/2007 | Nanjo | 396/241 |
| 2009/0160974 | A1 | 6/2009 | Oyama | 348/231.2 |
| 2009/0185039 | A1 | 7/2009 | Hatanaka | 348/207.1 |
| 2009/0225189 | A1* | 9/2009 | Morin | 348/229.1 |
| 2009/0244301 | A1* | 10/2009 | Border et al. | 348/208.99 |
| 2010/0044822 | A1* | 2/2010 | Longoni et al. | 257/446 |
| 2010/0208099 | A1* | 8/2010 | Nomura | 348/223.1 |
| 2011/0298946 | A1* | 12/2011 | Guan et al. | 348/223.1 |
| 2012/0020553 | A1* | 1/2012 | Pettigrew et al. | 382/164 |
| 2012/0069235 | A1* | 3/2012 | Imai | 348/333.11 |
| 2012/0127301 | A1* | 5/2012 | Imai | 348/135 |
| 2012/0127334 | A1* | 5/2012 | Imai | 348/223.1 |
| 2012/0206631 | A1* | 8/2012 | Imai | 348/242 |
| 2012/0206632 | A1* | 8/2012 | Imai | 348/242 |

OTHER PUBLICATIONS

F. Zaraga, et al., "White balance by tunable spectral responsivities", J. Opt. Soc. Am. A27, 31-39 (2010).
Boston Applied Technologies, Inc., "Focal Plane Array with Arbitrary Tunable Spectral Response", Air Force SBIR/STTR Innovation, (2009).

(Continued)

*Primary Examiner* — Twyler Haskins
*Assistant Examiner* — Wesley J Chiu
(74) *Attorney, Agent, or Firm* — Fitzpatrick, Cella, Harper & Scinto

(57) ABSTRACT

Image capture by using an imaging assembly having spectral sensitivities which are tunable in accordance with a capture parameter. First and second capture parameters are applied respectively to first and second regions of a scene, and a preview image is captured and displayed, together with a user interface which permits a user to adjust a transition of the capture parameter at a boundary between the first and second regions. Further preview images may be captured and displayed until the user is satisfied with the appearance of the preview image at the boundary of the first and second regions. A final image is captured using the first and second capture parameters together with any adjustment to the transition of the capture parameters at the boundary between the first and second regions.

12 Claims, 13 Drawing Sheets

(56) References Cited

OTHER PUBLICATIONS

A. Longoni, et al., "The transverse field detector (TFD): a novel color-sensitive CMOS device", IEEE Electron Device Letters, 29, pp. 1306-1308, (2008).
U.S. Appl. No. 12/772,841, filed May 3, 2010, Applicant: Francisco Imai.
U.S. Appl. No. 12/789,323, filed May 27, 2010, Applicant: Francisco Imai.
U.S. Appl. No. 12/789,334, filed May 27, 2010, Applicant: Francisco Imai.
U.S. Appl. No. 12/859,115, filed Aug. 18, 2010, Applicant: Francisco Imai.
U.S. Appl. No. 12/871,826, filed Aug. 30, 2010, Applicant: Francisco Imai.

* cited by examiner

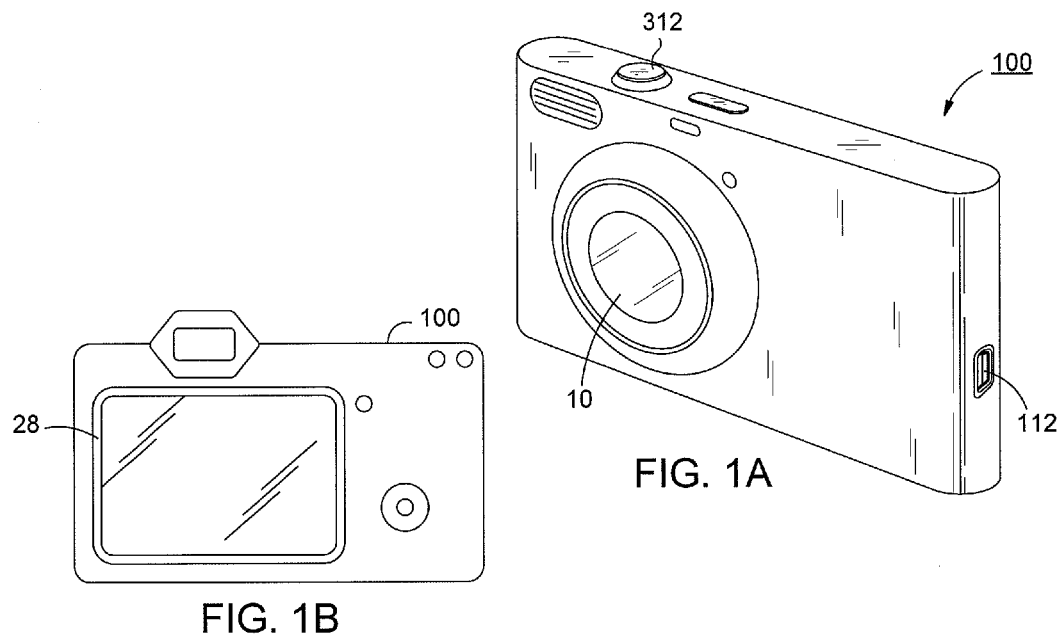
FIG. 1A
FIG. 1B
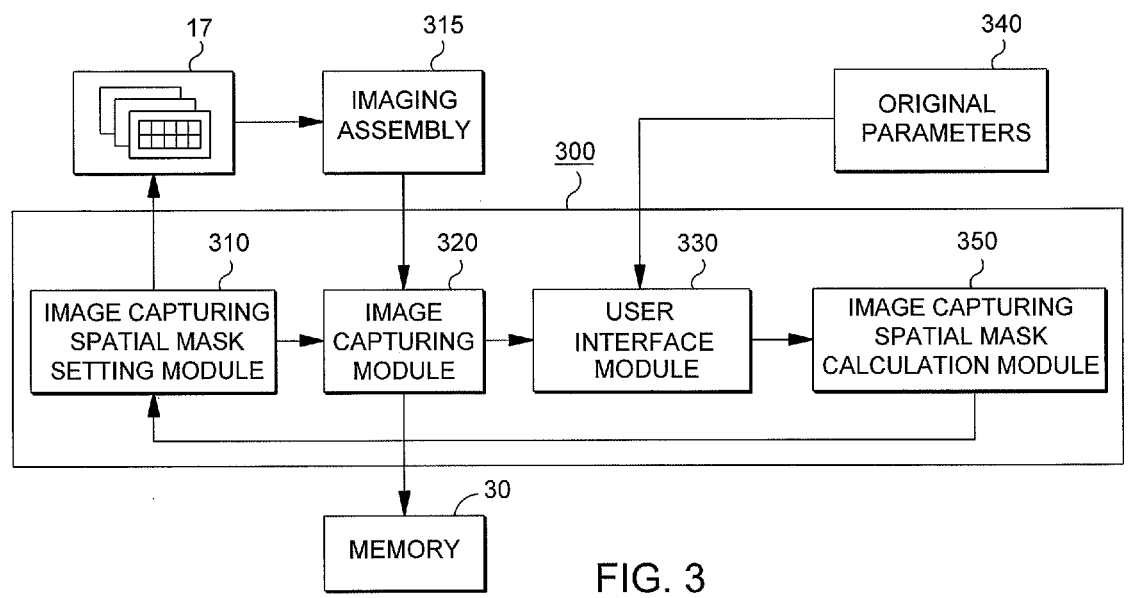
FIG. 3

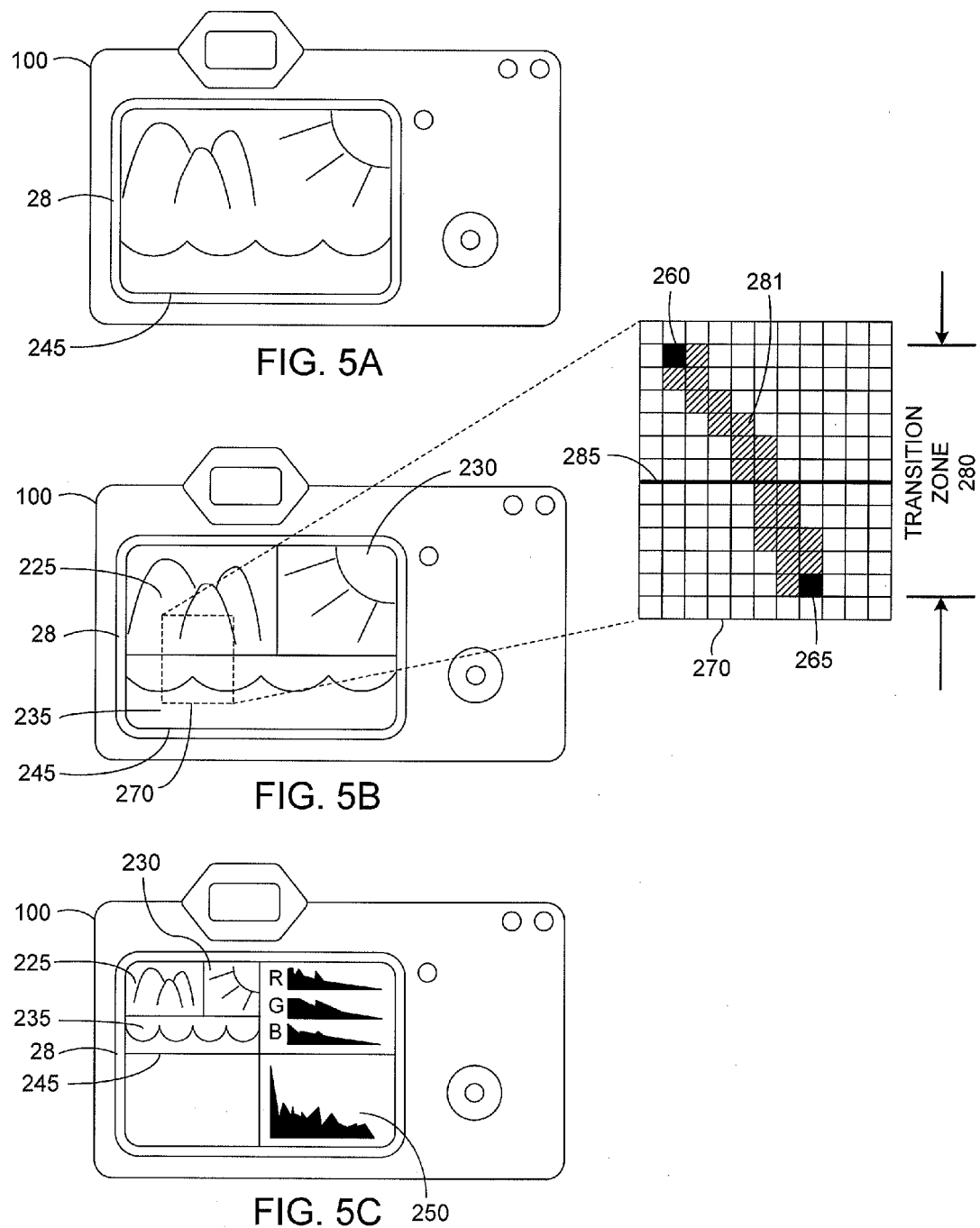

IMAGE CAPTURE WITH ADJUSTMENT OF IMAGING PROPERTIES AT TRANSITIONS BETWEEN REGIONS

FIELD

The present disclosure relates to image capture, and more particularly relates to adjustment of imaging properties for an image capture device.

BACKGROUND

In the field of photography, a photographer is often confronted with scenes that have extreme imaging properties, such as high dynamic range and unusual color balance. Dynamic range typically refers to a ratio between maximum and minimum values of physical measurement, and in photography specifically refers to a ratio of luminance values. Color balance typically refers to a comparative ratio of intensities of colors in an image.

Examples of scenes with extremes in imaging properties include scenes with high dynamic range or unusual color balance. In some cases, such a scene may have multiple different regions, each with different brightness levels or a different color balance. For example, a scene might include a first region depicting bright day light and a second region depicting dark shadow. In this situation, the first region depicting bright day light has a different brightness level and a different color balance than the second region depicting dark shadow.

Furthermore, such scenes typically include transitions between the multiple different regions. For example, a scene including regions with well-defined edges, such as a scene including a bright window in a dark room, has an abrupt transition in imaging properties. On the other hand, a scene including regions without well-defined edges, such as a scene including clouds in the sky, has a more smooth transition in imaging properties.

When confronted with such a scene, the photographer is often compelled to capture many images of the scene, each with different exposure settings, such as shutter speed and/or color balance. Then in post-capture image processing, the photographer combines the images into an acceptable rendition of the scene. This acceptable rendition may not be achievable due to loss of information during capture, such as saturated channels, that cannot be easily estimated or reconstructed. Moreover, the photographer is often compelled to use post-capture image processing tools in order to achieve an accurate or desired transition between the multiple regions of the scene. Such post-capture image processing tools are often cumbersome and inflexible.

SUMMARY

Recently, imaging assemblies have been developed in which the imaging assemblies have a tunable spectral response. Two examples of such imaging assemblies are described here. In the first example of imaging assemblies which have a tunable spectral response, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008) and U.S. Patent Publication No. 2010/0044822, the contents of which are incorporated herein by reference. These documents describe a transverse field detector (TFD) which has a tunable spectral responsivity that can be adjusted by application of bias voltages to control electrodes. Each pixel outputs signals for a red-like channel, a green-like channel, and a blue-like channel.

In some of these image sensors, the spectral responsivity is tunable on a pixel by pixel basis or a region-by-region basis. Bias voltages are applied in a grid-like spatial mask, such that the spectral responsivity of each pixel is tunable individually of other pixels in the image sensor, or such that the spectral responsivity of each region comprising multiple pixels is tunable individually of other regions in the image sensor.

In the second example of imaging assemblies which have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted by application of bias voltages to control electrodes. Each array element thus filters light incident on corresponding pixels of the image sensor, and the image sensor thereafter outputs signals from which a red-like channel, a green-like channel, and a blue-like channel, can all be derived for each pixel. In the case of a color filter array with temporal sensing, the channels for each pixel may be output sequentially, one after the other. In the case of a color filter array with spatial sensing, the channels for each pixel may be output simultaneously or nearly so, although demosaicing might be required depending on the geometry of the color filter array.

In some of these color filter arrays, the spectral responsivity is tunable on a pixel by pixel basis or a region-by-region basis. Bias voltages are applied in a grid-like spatial mask, such that the spectral responsivity for each pixel is tunable individually of other pixels, or such that the spectral responsivity for each region comprising multiple pixels is tunable individually of other regions.

According to an aspect of the disclosure herein, an image capture apparatus is provided with an imaging assembly configured to capture an image and acquire image data. The imaging assembly has tunable sensitivities controlled by a capture parameter, such as voltages applied to each pixel of an image sensor which has tunable spectral responsivity, or such as voltages that are applied to each array element of a color filter array which has tunable spectral responsivity. The color sensitivities for each pixel are thereby adjusted in accordance with a spatial mask.

Using an imaging assembly having spectral sensitivities which are tunable, the foregoing situation of scenes with extreme transitions in imaging properties is addressed by capturing a scene with a first capture parameter for the imaging assembly in a first region of the scene and a second capture parameter for the imaging assembly in a second region of the scene, displaying a preview of the captured image of the scene, and displaying a user interface to adjust a transition of the capture parameter at a boundary between the first region and the second region.

Thus, in an example embodiment described herein, an apparatus includes an imaging assembly for capturing an image of a scene, wherein the imaging assembly has spectral sensitivities which are tunable in accordance with a capture parameter. A display screen displays a preview of a captured image of the scene, wherein the scene is captured with a first capture parameter for the imaging assembly in a first region of the scene and a second capture parameter for the imaging assembly in a second region of the scene. The display screen also displays a user interface to adjust a transition of the capture parameter at a boundary between the first region and the second region.

By virtue of this arrangement, it is ordinarily possible to capture an image of a scene based on user adjustment of the transition of the capture parameter at a boundary between first and second regions of the scene. For example, it is typically possible for a user to select imaging properties such that the image is captured with good exposure and good color balance at the boundary between first and second regions. In addition, it is ordinarily possible to do so with a single image capture operation, even for difficult scenes such as scenes with multiple regions having multiple transitions each having different dynamic ranges or unusual color balance.

In one example embodiment, the user interface includes an indication of current transition for the capture parameter, and accepts user manipulation to change the current transition. In this case, the current transition comprises an automated transition which is calculated automatically based on scene elements in the first region and in the second region.

In some example embodiments, the display screen is constructed to display a user interface to select between an automated transition calculated automatically for the transition of the capture parameter at the boundary between the first and second region, and manual adjustment of the transition of the capture parameter at the boundary between the first and second region.

Furthermore, in some example embodiments, a controller is constructed to apply a default capture parameter to the imaging assembly, to obtain a sampled image from the imaging assembly based on the default capture parameter, to analyze the sampled image to identify the first region and the second region, and to calculate the first and second capture parameter for subsequent application to the imaging assembly. In one embodiment, the controller is further constructed to calculate an automated transition of the capture parameter at the boundary between the first and second region. In another embodiment, the controller is further constructed to cause the display screen to display a user interface for selection between the automated transition or a manual adjustment of the transition.

In example embodiments, the capture parameter includes at least one of brightness level and color balance due to differing illuminants. In some example embodiments, the capture parameter comprises an electronic spatial mask.

In some example embodiments, the imaging assembly comprises an image sensor having spectral sensitivities which are tunable. In other example embodiments, the imaging assembly comprises an image sensor and a preceding color filter array having spectral sensitivities which are tunable.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 1A and 1B are representative views for explaining the exterior appearance of an image capture device relevant to one example embodiment.

FIG. 3 is a view for explaining software architecture of the image capture device shown in FIG. 1 according to one example embodiment.

FIG. 5A is a view for explaining display of a preview image by the image capture device shown in FIG. 1 according to one example embodiment.

FIG. 5B is a view for explaining acceptance of a designation of a region of interest and transition of a capture parameter across a transition zone according to one example embodiment.

FIGS. 5C to 5E are views for explaining acceptance of a selection of a targeted imaging property according to one example embodiment.

DETAILED DESCRIPTION

<FIGS. 1 to 6>

Figure 2A:
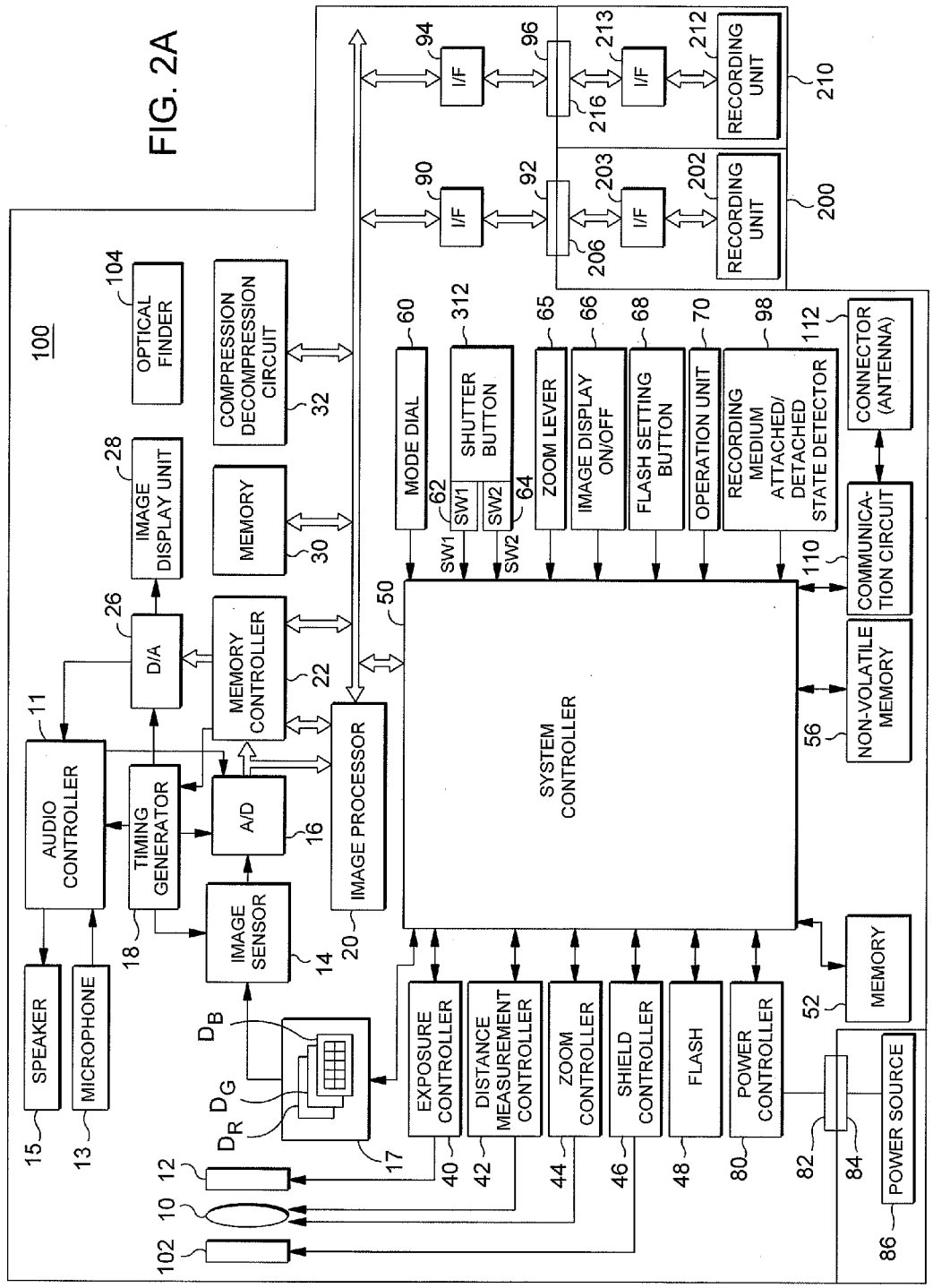
FIGS. 2A and 2B are detailed block diagrams for explaining the internal architecture of the image capture device shown in FIG. 1 according to one example embodiment.

FIGS. 1A and 1B are representative views for explaining the exterior appearance of an image capture device relevant to one example embodiment. Note in these figures, some components are omitted for description purpose. As shown in FIGS. 1A and 1B, image capture device 100 is constructed as an embedded and hand held device including a optical system 10 and a connector 112 for connection to external devices. In the embodiment of FIGS. 1A and 1B, interface connector 112 is a USB interface connector, but other wired and wireless interfaces may be used.

Image capture device 100 further includes a variety of user interfaces for permitting a user to interact therewith, such as shutter release 312, an image display unit 28 for displaying menus and thumbnail images, and a series of selector buttons for permitting display and selection of menu items.

While FIGS. 1A and 1B depict one example embodiment of image capture device 100, it should be understood that the image capture device 100 may be configured in the form of, for example, a digital camera, a video camera, or any type of device including a camera, such as a pager, a cellular telephone, a radio telephone, a personal computer, a personal digital assistant (PDA), a Moving Pictures Expert Group Layer 3 (MP3) player, and/or the like.

FIG. 2A is a detailed block diagram for explaining the internal architecture of the image capture device 100 shown in FIG. 1 according to one example embodiment. Referring to FIG. 2A, reference numeral 10 denotes an imaging lens; 12, a shutter having an aperture function; and 14, an image sensor which has a spectral response which is tunable in accordance with a capture parameter, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2A, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is an image sensor which has a spectral response which is tunable in accordance with a capture parameter 17. For each pixel, image sensor 14 outputs three or more channels of color information, including a red-like channel, a green-like channel and a blue-like channel. The precise nature of the spectral responsivity of image sensor 14 is controlled via capture parameter 17. In this embodiment, capture parameter 17 may be comprised of multiple spatial masks, with one mask each for each channel of information output by image sensor 14. Thus, in this example, where image sensor 14 outputs three or more channels, capture parameter 17 includes a spatial mask DR for the red-like channel of information, a spatial mask DG for the green-like channel of information, and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 312 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
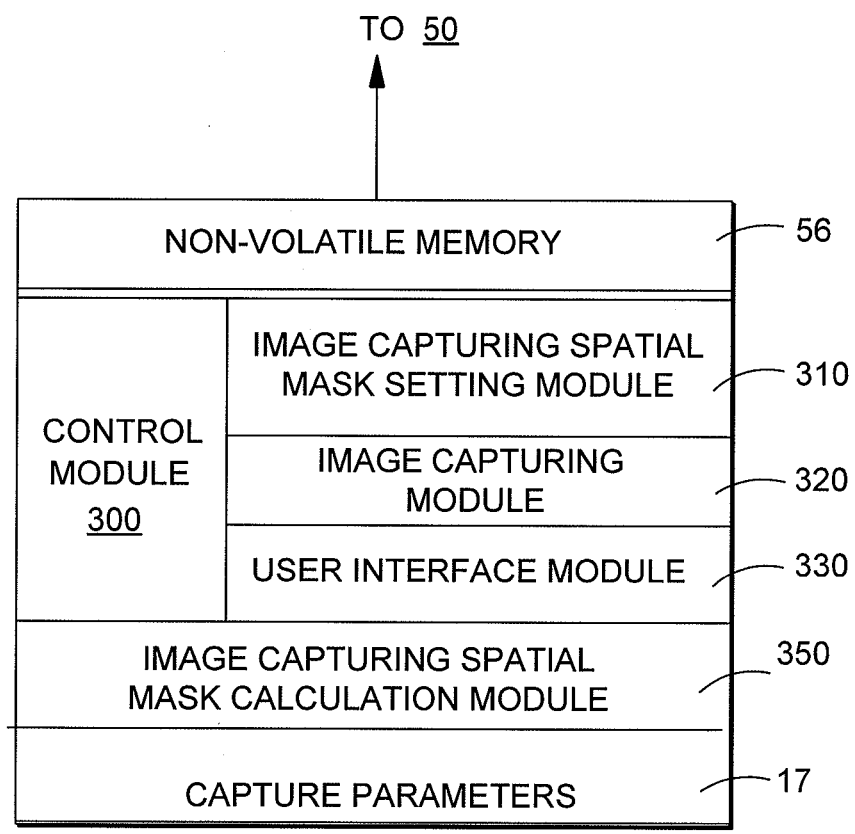

In particular, and as shown in FIG. 2B, non-volatile memory 56 is an example of a non-transitory computer-readable memory medium, having stored thereon control module 300 as described herein. According to this example embodiment, the control module 300 includes at least image capturing spatial mask setting module 310, image capturing module 320, user interface module 330 and image capturing spatial mask calculation module 350. Briefly, the image capturing spatial mask setting module 310 comprises computer-executable process steps executed by a computer for applying a first capture parameter to the imaging assembly in a first region of the scene and for applying a second capture parameter to the imaging assembly in a second region of the scene. The image capturing module 320 comprises computer-executable process steps executed by a computer for capturing the image of the scene by using the imaging assembly whose spectral response is tuned in accordance with the first capture parameter in the first region of the scene and in accordance with the second capture parameter in the second region of the scene. The user interface module 330 comprises computer-executable process steps executed by a computer for displaying a preview of the captured image of the scene, wherein the scene is captured with a first capture parameter for the imaging assembly in a first region of the scene and a second capture parameter for the imaging assembly in a second region of the scene, and for displaying a user interface to adjust a transition of the capture parameter at a boundary between the first region and the second region. Image capturing spatial mask calculation module 350 comprises computer-executable process steps executed by a computer for computing a revised capture parameter for the imaging assembly. These modules will be discussed in more detail below with respect to FIG. 3.

Also stored on non-volatile memory 56 are pre-designated capture parameters 17 for application to image sensor 14 so as to control spectral responsivity of the imaging assembly. In this embodiment, the capture parameters 17 are comprised of spatial masks so as to permit pixel-by-pixel or region-by-region control of spectral responsivity, independently of other pixels or regions.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 312, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 312 arranged on the digital camera 100, and generates a first shutter switch signal SW1. Also, the shutter switch 64 is turned on upon completion of operation (full stroke) of the shutter button 312, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on, which are not shown in FIG. 2A. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

FIG. 3 is a view for explaining software architecture of the image capture device 100 of FIG. 1 according to one example embodiment. As previously discussed with respect to FIG. 2B, control module 300 comprises computer-executable process steps stored on a non-transitory computer-readable storage medium, such as non-volatile memory 56. In this example embodiment, as shown in FIG. 3, control module 300 includes computer-executable process steps for at least the image capturing spatial mask setting module 310, the image capturing module 320, the user interface module 330, and the image capturing spatial mask calculation module 350.

The image capturing spatial mask setting module 310 is constructed to apply capture parameters 17 to the imaging assembly 315 which includes tunable image sensor 14 for setting the spectral response of the tunable imaging assembly to a setting. More specifically, for example, image capturing spatial mask setting module 310 applies a first of capture parameters 17 to the tunable image sensor 14 in a first region of a scene and applies a second of capture parameters 17 to the tunable image sensor 14 in a second region of the scene. As another example, image capturing spatial mask setting module 310 applies a default capture parameter to the imaging assembly 315 including tunable image sensor 14. In this example embodiment, the default capture parameter is provided by image capture device 100 automatically, based on scene elements in the ROI. In other example embodiments, the default capture parameter is provided in any suitable manner, including, for example, by user specification or by the manufacturer.

The image capturing module 320 is constructed to capture image data of a scene from the imaging assembly 315 using the capture parameter 17 applied by the image capturing spatial mask setting module 310. Image data which is captured by the imaging assembly 315 is stored in memory 30. In particular, in this example embodiment, imaging assembly 315 comprises tunable image sensor 14, such that the image data of the scene is captured using tunable image sensor 14 and stored in memory 30.

The user interface module 330 is constructed to display a preview of the captured image of the scene as well as various user interfaces. In this embodiment, the preview of the scene is captured using imaging assembly 315 tuned in accordance with capture parameters such as a first capture parameter in a first region of the scene and a second capture parameter in a second region of the scene. In particular, in this example embodiment, imaging assembly 315 comprises tunable image sensor 14, such that the preview image is captured using tunable image sensor 14.

User interface module 330 is constructed to accept a user designation of a ROI in the preview image, and to accept a user selection of a targeted imaging property for each ROI, via user manipulation of the user interface. In one example embodiment, the user interface module 330 displays a brightness range, such as a brightness histogram, of the preview image data and accepts a user manipulation of the brightness range. In some embodiments, the user interface module 330 displays color channel ranges, such as color channel histograms. In other embodiments, user interface module 330 displays an interface which accepts a numerical value for the imaging property.

The user interface module 330 is further constructed to display a user interface to adjust a transition of the capture parameter at a boundary between the first region and the second region. More specifically, user interface module 330 obtains original parameters 340 for the captured image data in order to display a current transition of the capture parameter at the boundary between the first and second regions. Original parameters 340 are statistical values of the imaging properties that characterize the ROI before adjustment by the user. For example, the original imaging property values may be a median of the brightness values or a median of the RGB values for the designated ROI. In this example embodiment, the original imaging property values are previously stored by the image capture device 100 when image capturing module 320 captures image data of a scene from the image sensor 14, for example, in memory 56. In this case, user interface module 330 accesses memory 56 in order to obtain the original parameters 340 for the ROI.

Image capturing spatial mask calculation module 350 comprises computer-executable process steps stored on a non-transitory computer-readable storage medium, such as non-volatile memory 56. Image capturing spatial mask calculation module 350 computes a revised capture parameter for the imaging assembly 315, including revised parameters for the transition of the capture parameters, based on the selection of targeted imaging properties and the adjustment of the current transition. The revised capture parameter is provided to image capturing spatial mask setting module 310 for application to image sensor 14, such that image sensor 14 is tuned in accordance with the revised capture parameter.

Figure 4A:
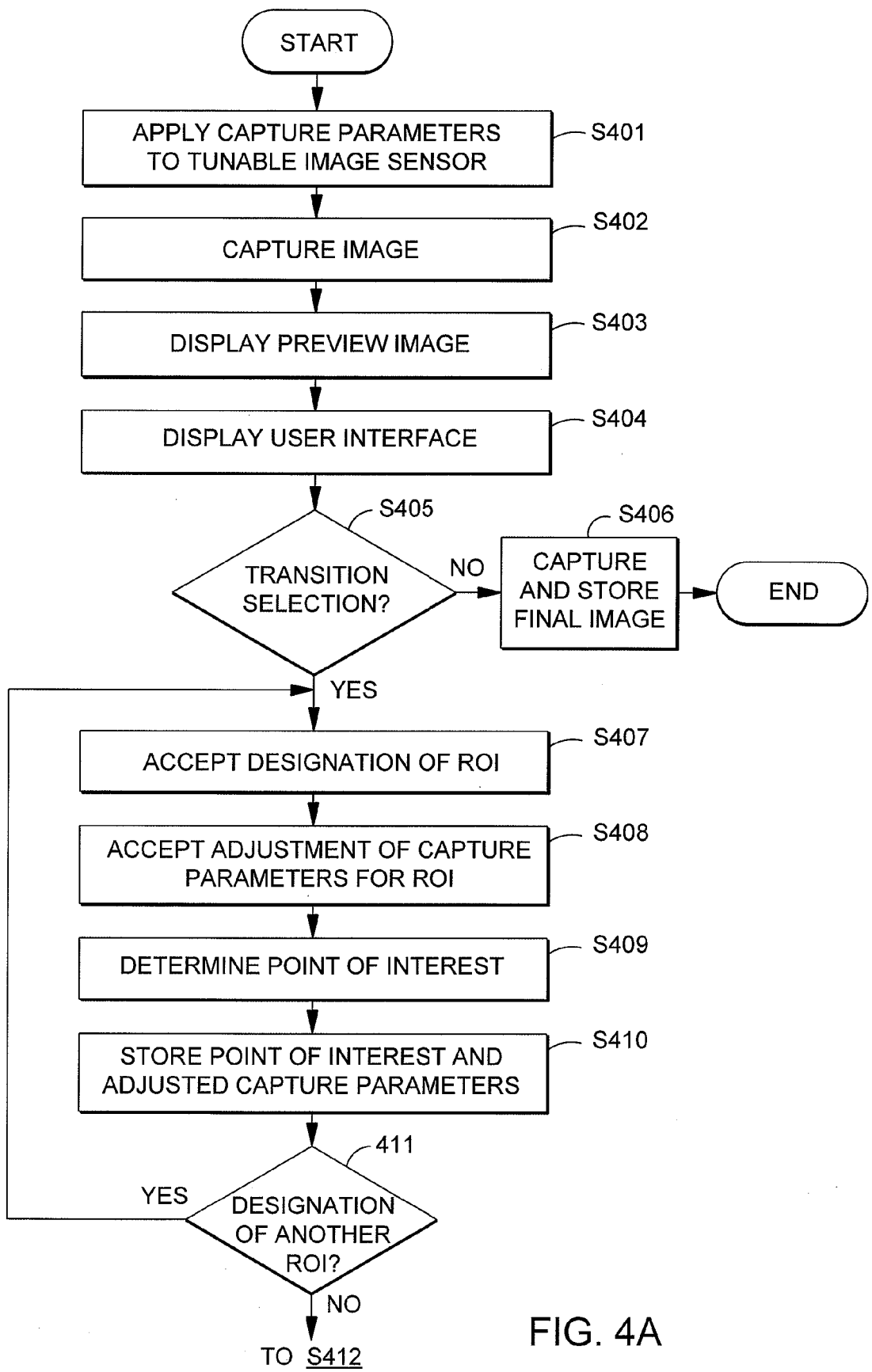
FIGS. 4A and 4B are flow diagrams for explaining processing in the image capture device shown in FIG. 1 according to one example embodiment.
Figure 4B:
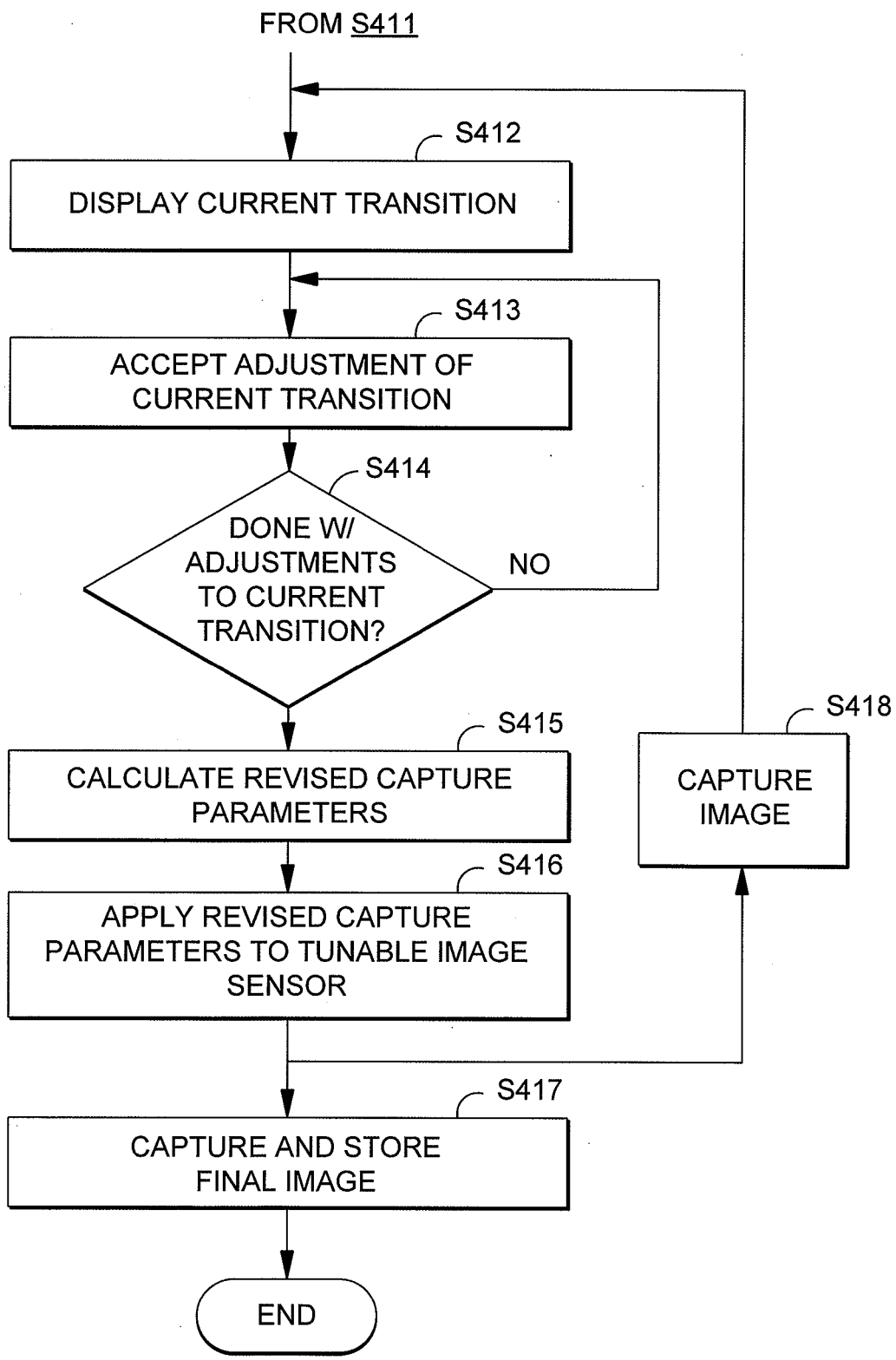

FIGS. 4A and 4B are flow diagrams for explaining processing in the image capture device shown in FIG. 1 according to one example embodiment. Briefly, according to FIGS. 4A and 4B, an image of a scene is captured by using an imaging assembly having spectral sensitivities which are tunable in accordance with a capture parameter. A first capture parameter is applied to the imaging assembly in a first region of the scene. A second capture parameter is applied to the imaging assembly in a second region of the scene. The image of the scene is captured by using the imaging assembly whose spectral response is tuned in accordance with the first capture parameter in the first region of the scene and in accordance with the second capture parameter in the second region of the scene. A preview of the captured image of the scene is displayed, wherein the scene is captured with a first capture parameter for the imaging assembly in a first region of the scene and a second capture parameter for the imaging assembly in a second region of the scene. A user interface is displayed, to adjust a transition of the capture parameter at a boundary between the first region and the second region.

In more detail, the process shown in FIGS. 4A and 4B starts with application of a default capture parameter, then capturing an image using the default capture parameter. The image is captured and displayed on the image display unit 28 by a half stroke of shutter switch (SW1) 62 before the shutter switch (SW2) 64 is switched on by a full stroke of the shutter button by a user of the image capture device 100.

For purposes of illustration, the process depicted in FIG. 4A will be described in connection with the user interfaces depicted in FIGS. 5A to 5E, and the process depicted in FIG. 4B will be described in connection with the user interfaces depicted in FIGS. 6C to 6F.

As shown in FIG. 4A, in step S401, image capturing spatial mask setting module 310 applies a default capture parameter to the tunable image sensor 14 for setting the spectral response of the tunable imaging assembly to a predesignated default setting. In this embodiment, the default capture parameter comprises an electronic spatial mask which individually tunes each pixel or each region of plural pixels in tunable image sensor 14.

In step S402, image capturing module 320 captures preview image data of a scene from the image sensor 14 using the default capture parameter applied by the image capturing spatial mask setting module 310. In this example embodiment, image capture device 100 automatically determines a color balance for the preview image data, and automatically derives a capture parameter for the preview image data to be applied to image sensor 14. In this case, image capturing module 320 captures preview image data of a scene using the capture parameter automatically derived by image capture device 100.

In step S403, user interface module 330 displays a preview image 245 based on the image data captured in step S402, for example, as shown in FIG. 5A. In particular, FIG. 5A shows a rear view of image capture device 100 having image display unit 28. According to this example embodiment, image display unit 28 displays the preview image 245 based on image data of a scene captured in step S402. In some example embodiments, the display in step S403 includes ranges for imaging properties of the preview image, in addition to the preview image. In this case, the imaging property ranges for the preview image, such as histograms or slide bars, are displayed together with the preview image.

In step S404, user interface module 330 displays a user interface including a selection of a transition mode, and accepts a user selection of the transition mode. Transition mode allows the user to select ROIs and values of an imaging property for each ROI, as well as the values of the imaging property at the transition between the selected ROIs.

In step S405, it is determined whether transition mode is selected. If transition mode is not selected ("NO" in step S405), the flow proceeds to step S406 where image capturing module captures and stores a final image using the default capture parameter.

If transition mode is selected ("YES" in step S405), the flow proceeds to step S407 where designation of a ROI is accepted. As previously noted, the ROI may be designated by the user or automatically designated by image capture device 100. FIG. 5B is a view for explaining acceptance of a designation of the ROI. As shown in FIG. 5B, the preview image 245 displayed on the image display unit 28 depicts a preview image divided into a plurality of regions. In particular, the preview image includes three regions, such as regions 225, 230, 235. In region 225 of the preview image, a landscape of mountains in the background is displayed. In region 230, the sun is displayed. In region 235, a body of water is displayed.

In the case that the user designates the ROI in step S407, the user of the image capture device 100 views the preview image 245 displayed on the image display unit 28 as shown in FIG. 5A, and decides whether an imaging property for at least one of the regions 225, 230, or 235 should be adjusted. In this example embodiment, if the user decides to adjust the imaging property for a designated ROI, the image is divided for the user to select and adjust the imaging property for the designated ROI. For example, if the user decides that the brightness values for the three different areas of the image should be adjusted, the image is divided into three regions of interest for the user to select and adjust the exposure values. If the user decides that the color balance values for the three different areas of the image should be adjusted, the image is divided into three regions of interest for the user to select and adjust the color balance values.

More specifically, in step S407, the user interface module 330 accepts the user designation of the ROI in the preview image, for example, as shown in FIG. 5B. In this embodiment, the image display unit 28 is a touch screen, and the user designates ROI 225, 230, or 235 by contacting the region of the image 245 displayed on the image display unit 28. In other embodiments, the ROI is designated by the user through an input via a button associated with the operation unit 70 which is then relayed to the system controller 50, or by voice command.

When the user designates the ROI in the preview image 245, user interface module 330 determines the pixels of the image which are included in the ROI. This determination may be made in a similar manner as discussed above with respect to automatic designation of the ROI, for example by using a spatial filtering algorithm or the illumination of each pixel. In other example embodiments, user interface module 330 divides the preview image 245 into regions 225, 230 and 235 before the user interface module 330 accepts the user designation of the ROI. In this case, the user of the image capture device selects the quantity of regions to divide the displayed image. In some embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

Alternatively, in the case that the ROI is automatically designated by image capture device 100, the image capture device 100 analyzes the image data of the preview image 245 in order to identify the multiple regions (e.g., 225, 230 and 235) of the scene and designates one ROI in step S407. For example, image capture device 100 may execute a spatial filtering algorithm to determine the edges of the ROIs in order to designate one ROI. Alternatively, the illumination of each pixel in the preview image is determined, and pixels having substantially the same illumination are determined to be included in a ROI. Of course, any other suitable algorithms for dividing the image into regions can also be used.

After the ROI is designated automatically or by the user in step S407, adjustment of the capture parameters for the ROI is accepted in step S408. The capture parameters for the ROI may be adjusted by the user, or automatically by image capture device 100.

Figure 5D:
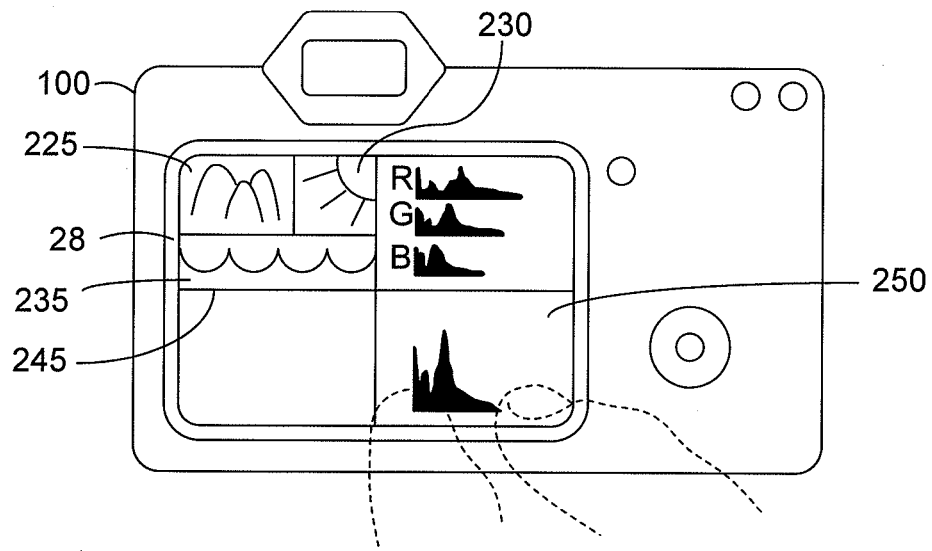
Figure 5E:
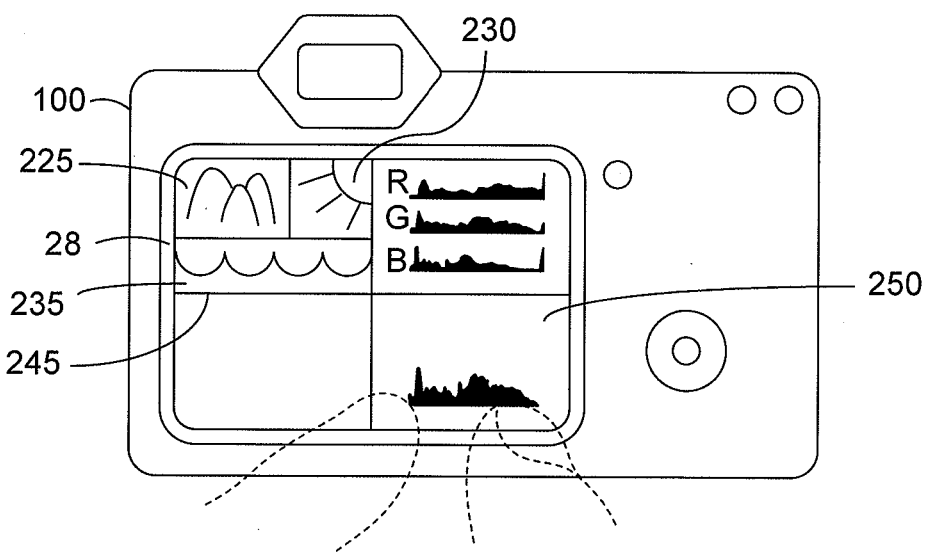

In the case that the capture parameters are adjusted by the user, in step S408, user interface module 330 accepts a user selection of a targeted imaging property for the ROI, for example, as shown in FIGS. 5C to 5E. In particular, FIGS. 5C to 5E are examples of user interfaces including imaging property ranges 250, which effect the selection of target ranges for such imaging properties. Generally, in this case, capture parameters for the ROI are adjusted based on the user selection of the targeted imaging property via the user interface.

As shown in FIG. 5C, image display unit 28 displays on the user interface an imaging property range 250 of the image data 245 previewed on image display unit 28. By manipulating the imaging property range 250 as shown in FIGS. 5D and 5E, the user effects the selection of the targeted imaging property for the designated ROI. In some example embodiments, the user interface displays an imaging property range 250 including values of the imaging property which fall within a tunable range of the imaging assembly. As discussed below in more detail, after the user designates one ROI and selects a target range for the imaging property for the designated region, the user may then designate a different region on the image display unit 28. With this arrangement, the user advantageously specifies the imaging property associated with a specific region of interest in the image 245 displayed on the image display unit 28, rather than making a global adjustment to the entire image 245 displayed on the image display unit 28. Furthermore, the user advantageously specifies the imaging property based on any suitable criteria, including, for example, a lookup table and/or aesthetic concerns.

For example, in the case that the targeted imaging property is a target range for color balance, the image display unit 28 displays on the user interface color channel ranges 250 of the image data 245 previewed on image display unit 28, and a user manipulation of the color channel ranges is accepted so as to effect the selection of the target range for color balance for the ROI. In some example embodiments, the color channel ranges 250 are displayed as color channel histograms, as shown in FIGS. 5C to 5E. In other example embodiments, the color channel ranges are displayed as slide bars, dials, buttons, or any other type of suitable representation. By manipulating the color channel ranges, the user effects the selection of the target range for color balance for the region of interest. With this arrangement, the user selects the target range for color balance for the designated ROI, typically with ease and simplicity.

In the case that the targeted imaging property is a target range for brightness, the image display unit 28 displays on the user interface a brightness range of the image data previewed on image display unit 28, and a user manipulation of the brightness range is accepted so as to effect the selection of the target range for brightness for the ROI. In some example embodiments, the brightness range is displayed as a brightness histogram. In other example embodiments, the brightness range is displayed as a slide bar, a dial, a button, or any other type of suitable representation. By manipulating the brightness range, the user effects the selection of the target range for brightness for the region of interest. With this arrangement, the user selects the target range for brightness for the designated region of interest, typically with ease and simplicity.

In this example embodiment, for a designated ROI, the user selects at least one targeted imaging property for adjustment. For example, the user can select one of the target range for brightness or the target range for color balance. In addition, the user can select both the target range for brightness and the target range for color balance. Thus, the user can select any combination of imaging properties for adjustment.

Moreover, in some example embodiments, ranges for all of the targeted imaging properties to be adjusted are displayed on a single user interface. For example, the user interface displays slide bars representing color channel ranges together with a slide bar representing a brightness range. Alternatively, selection of targeted imaging properties can be performed in a multi-step process, in which the user interface displays one or any combination of targeted imaging properties to be adjusted.

The user interfaces depicted in FIGS. 5A to 5E are merely examples of user interfaces which can be displayed by user interface module 330 according to this example embodiment. It should be understood that other types of suitable interfaces can also be displayed.

Alternatively, in the case that the capture parameters are automatically adjusted by image capture device 100, selection of the targeted imaging property is performed in step S408 based on scene elements in the ROI designated in step S407. In this case, image capture device 100 adjusts capture parameters for the ROI based on the selected imaging property. More specifically, image capture device 100 determines a targeted imaging property for the ROI by analyzing the scene elements in the ROI, calculates adjusted capture parameters based on the targeted imaging property, and accepts the adjusted capture parameters for the ROI in step S408.

After the ROI is accepted in step S407 and adjusted capture parameters for the ROI are accepted in step S408, a point of interest within the ROI is determined in step S409. As shown in FIG. 5B, coordinates indicating the location of the pixel representing the point of interest (e.g., 260 and 265) of a designated region are automatically determined by image capture device 100. In some example embodiments, the point of interest is determined to be the pixel of the image that is closest to the user's point of contact on image display unit 28 when the user designates the ROI in step S407. For example, if ROI 225 is designated in step S407, point of interest 260 is determined in step S409. As another example, if ROI 235 is designated in step S408, point of interest 265 is determined in step S409. In other embodiments, the point of interest is determined by using a centroid locating algorithm, such as k-means clustering, to analyze the image data. In still other embodiments, the point of interest is determined based on user instruction, by, for example, using the user interface.

FIG. 5B includes a portion 270 which is an enlarged view of a portion of the preview image 245. In the example of FIG. 5B, portion 270 includes point of interest 260 within ROI 225 and point of interest 265 within ROI 235. In this case, the transition 281 of the capture parameter at the boundary 285 between ROI 225 and ROI 235 is across transition zone 280, and includes the pixels of the image data which comprise continuous space at the boundary 285 between ROI 225 and ROI 235. Of course, in other embodiments the transition zone 280 may include more or less pixels than the pixels included in the transition zone 280 shown in FIG. 5B. In this regard, the pixels which are included in the transition zone 280 can be determined automatically by analyzing the image data, based on user instruction, or by any other suitable means. It should be noted that FIG. 5B is not to scale, but is depicted as shown in the interest of simplifying the explanation. An example in which the transition zone 280 is approximately 50 pixels is discussed below with respect to FIGS. 6A to 6F.

In step S410, the coordinates of the point of interest are stored together with the value of the adjusted capture parameter for the corresponding point of interest. More specifically, the value of the capture parameter is obtained for the point of interest determined in step S409, based on the adjustment of the capture parameters in step S408. In step S410, coordinates for the point of interest are stored together with the corresponding value of the adjusted capture parameter.

Figure 6A:
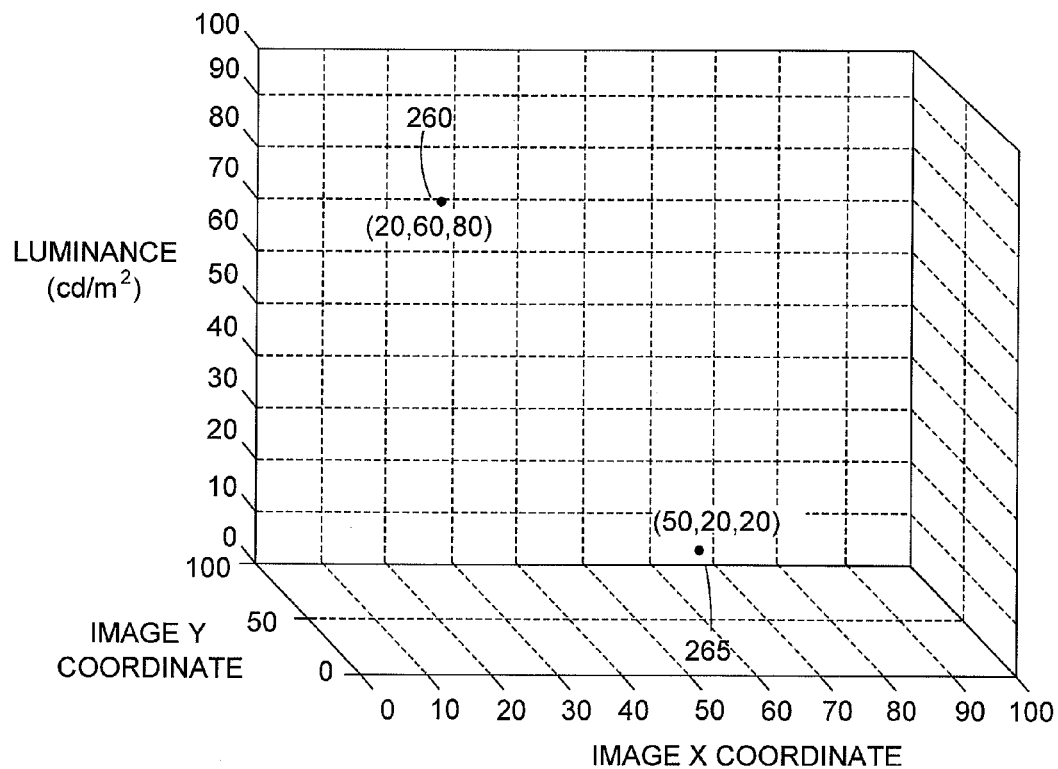
FIGS. 6A and 6B are views for explaining determination of points of interest within designated regions of interest and capture parameters for the points of interest according to one example embodiment.
Figure 6B:
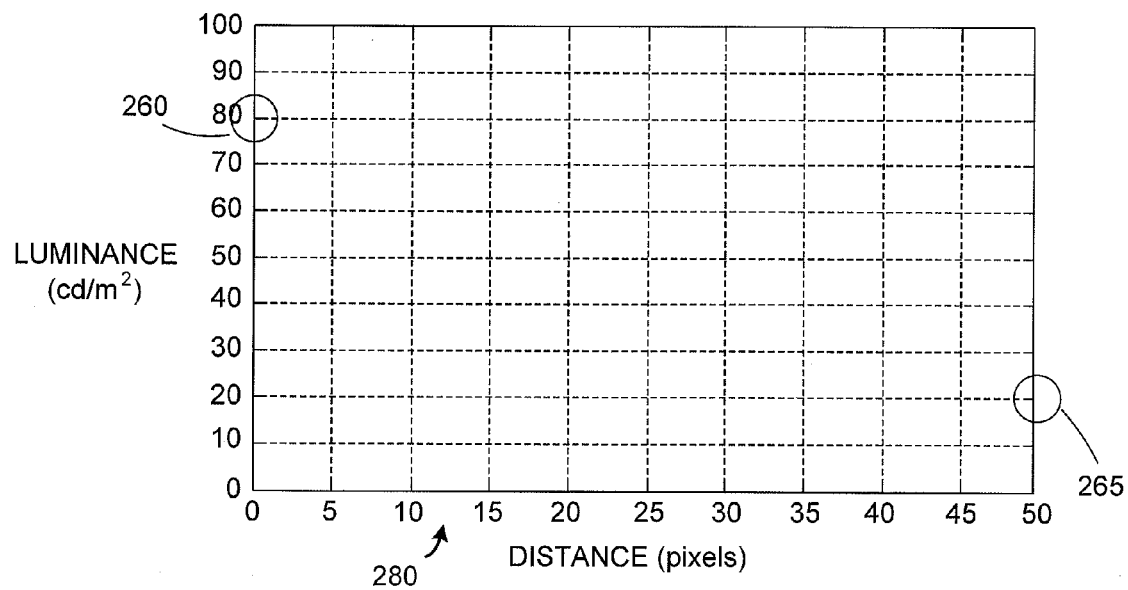

FIGS. 6A and 6B are graphical representations of the information stored in step S410. In particular, FIG. 6A is a tridimensional representation of a first point of interest (e.g., 260 shown in FIG. 5B) having a pixel location at (20, 60) and a second point of interest (e.g., 265 shown in FIG. 5B) having a pixel location at (50, 20). As shown in FIG. 6A, the first point of interest at (20, 60) has a luminance value of 80 cd/m$^2$. As also shown in FIG. 6A, the second point of interest at (50, 20) has a luminance value of 20 cd/m$^2$. FIG. 6B is a two dimensional representation of FIG. 6A, which depicts the distance between the first and second points of interest and the corresponding luminance values. The distance between the first and second points of interest (e.g., 50 pixels as shown in FIG. 6B) approximately corresponds to the length of the transition zone 280 between the regions.

In step S411, it is determined whether a second ROI has been designated, either automatically by image capture device 100 or by user designation. If the second ROI has been designated ("YES" at step S411), the flow returns to step S407 where the designation of the second ROI is accepted. At this time, in some example embodiments, the adjusted capture parameter is applied to the imaging assembly 315, and the user interface includes a preview image based on image data captured with the adjusted capture parameter. In step S408, user interface module 330 accepts an adjustment of the capture parameters for the second ROI. In step S409, the point of interest for the second ROI is determined and in step S410, the coordinates of the point of interest within the second ROI are stored together with the values of the corresponding capture parameters as adjusted in step S408.

If it is determined that a second ROI has not been designated ("NO" at step S611), the flow proceeds to step S412. In this example embodiment, at least two ROIs are selected, together with imaging properties for each of the ROIs, so that the transition 281 of the imaging properties at the boundary between the ROIs can be adjusted.

In order to adjust the transition 281 of the capture parameter at the boundary (e.g., boundary 285) between the first and second ROIs of the scene (e.g., 225 and 235), a user interface is displayed. In this example embodiment, in step S412, the user interface includes an indication of a current transition for the capture parameter, such as the transitions 281 depicted in FIGS. 6C to 6F. The current transition comprises an automated transition which is calculated automatically based on scene elements in the first and second ROIs. Furthermore, the image capture device may interpolate the values of the imaging property at the boundary 285 between regions in the scene, such that the transition 281 of the capture parameter between the regions is smooth. More specifically, after two points of interest (e.g., 260 and 265) are determined the values of the corresponding capture parameters are stored, pixels which are included in the transition zone 280 are determined, together with values of the capture parameter for the pixels in the transition zone 280. The current transition 281 of the capture parameter across the transition zone 280 is then displayed as shown in FIGS. 6C to 6F.

In some example embodiments, in step S412, a preview image is also displayed, wherein the preview image is captured using image sensor 14 tuned in accordance with the capture parameter adjusted in step S408. Thus, the preview image is based on image data captured with a first capture parameter for the imaging assembly in the first region of the scene and a second capture parameter for the second region of the scene.

In step S413, adjustment of the current transition 281 for the capture parameter is accepted. According to some example embodiments, the user interface includes an interface to select between an automated transition calculated automatically by image capture device 100 for the transition of the capture parameter at the boundary between the first and second ROIs, and a manual adjustment of the transition of the capture parameter at the boundary between the first and second ROIs.

Figure 6C:
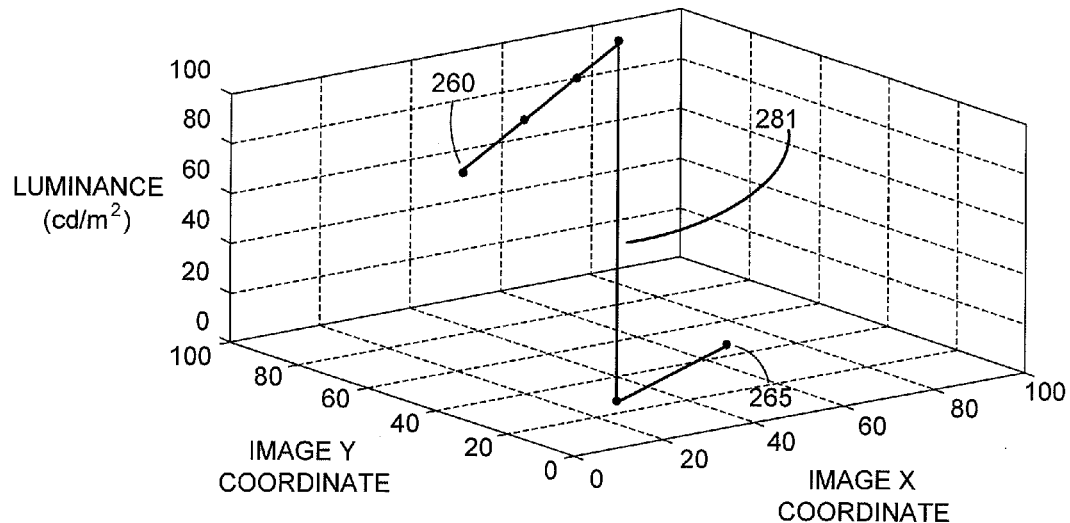
FIGS. 6C to 6F are views for explaining transition of a capture parameter at a boundary between first and second regions and acceptance of a change of the transition according to one example embodiment.
Figure 6D:
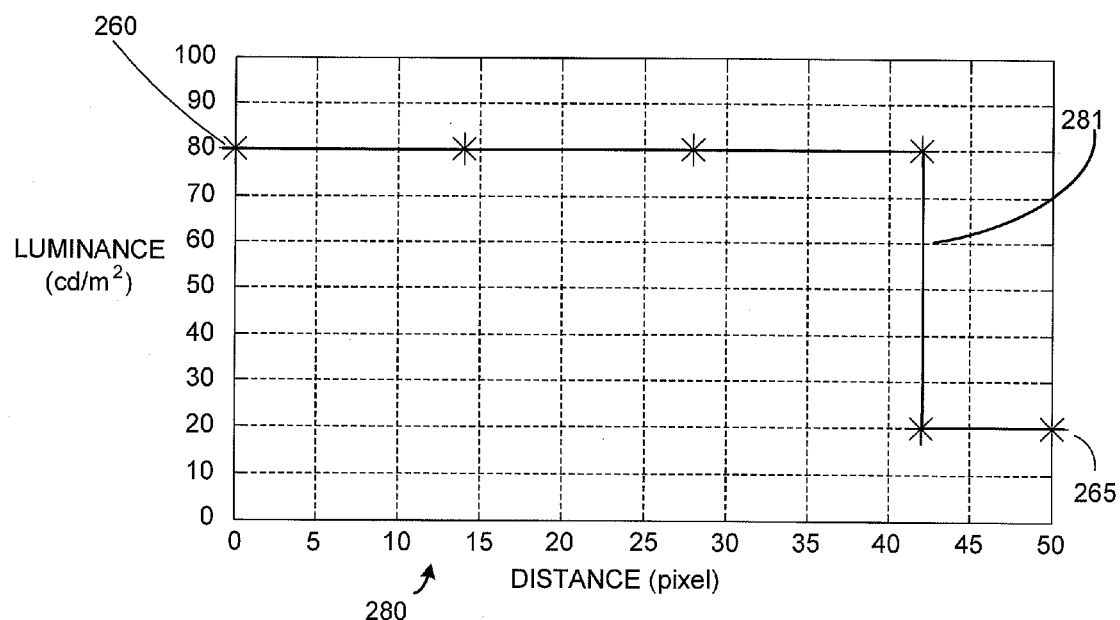
Figure 6E:
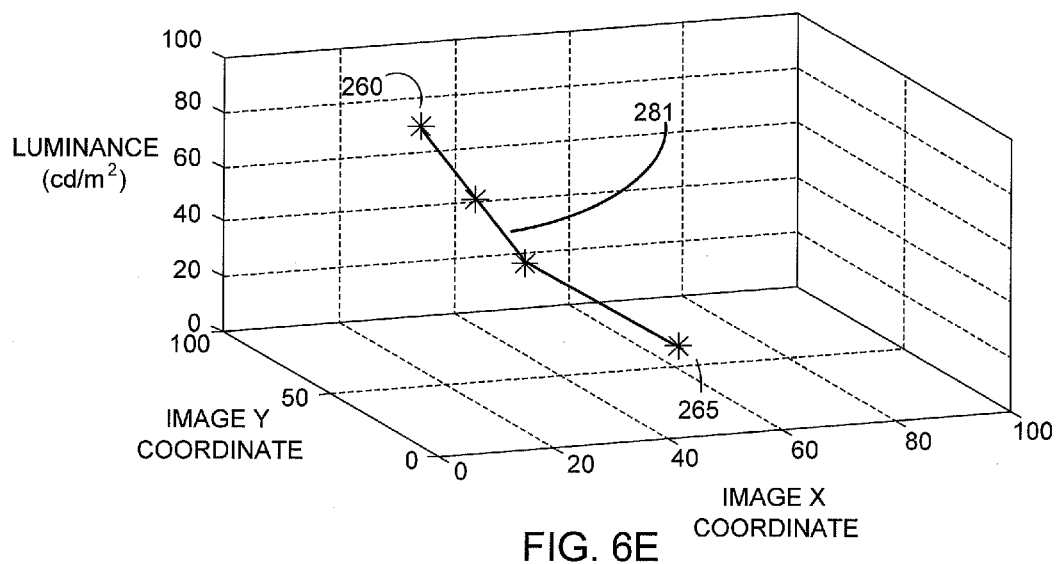
Figure 6F:
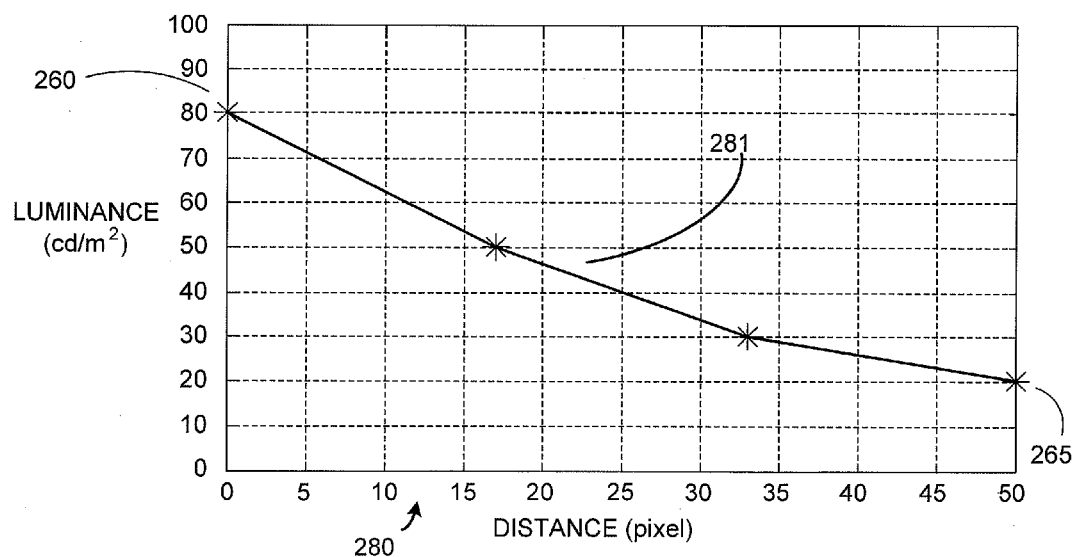

In the case that the transition 281 of the capture parameter is adjusted manually, the user adjusts the transition 281 by dragging points on the transition curve between the points of interest, and the user interface accepts the adjustment. In this case, the user interface displays a curve, such as the transition curve shown in FIGS. 6C to 6F. FIGS. 6C and 6D show an abrupt transition 281 for the imaging property, such as for scenes including regions with well-defined edges. FIGS. 6E and 6F show a smooth transition 281 for the imaging property, such as for scenes without well-defined edges.

The values of the capture parameter for the points of interest (e.g., 260 and 265) depicted in FIGS. 6C to 6F are anchored and not adjusted. The curve of the intermediate points between the points of interest can be adjusted by dragging the intermediate points between the points of interest 260 and 265, in order to change the transition 281 of the capture parameter. The intermediate points can be dragged by, for example, a single touch, multi-touch, eye gazing, voice command, or any other suitable means. The intermediate points to be dragged can be any number of points between the points of interest 260 and 265. For example, the number of intermediate points to be dragged can be selected by the user. Typically, for a transition which is smooth, such as transitions 281 shown in FIGS. 6E and 6F, the number of intermediate points to be dragged is relatively more than the number of points for an abrupt transition, such as transitions 281 shown in FIGS. 6C and 6D. The transition curves shown in FIGS. 6C to 6F are graphical representations of transfer functions which can then be applied to the pixels included in the transition zone 280, in order to adjust the transition 281 of the capture parameter at the boundary 285 between the ROIs.

In the case that the transition 281 of the capture parameter is adjusted by image capture device 100, the transition 281 of the capture parameter is automatically adjusted by the image capture device 100 based on scene elements in the designated ROIs.

In some example embodiments, a preview image is also displayed in step S413, wherein the preview image is captured using image sensor 14 tuned in accordance with the capture parameter adjusted in step S408 and the transition 281 of the capture parameter adjusted in step S413.

FIGS. 6A to 6F are examples in which 2 regions of interest have been selected and 2 corresponding points of interest have been determined. In other embodiments, 3 regions of interest are selected, and 3 corresponding points of interest are determined. In this case, the transition between the regions is represented by a surface, rather than a curve as shown in FIGS. 6C to 6F.

Furthermore, it should be noted that while FIGS. 6A and 6F depict an example in which the imaging property to be adjusted is a value of luminance, the user interface may also display transitions for color channel values, as well as other imaging properties. In addition, while the examples of FIGS. 6B, 6D and 6F show the two-dimensional representation based on the distance between the points of interest 260 and 265, other representations may be used.

In some example embodiments, in addition to the transition curve shown in FIGS. 6C to 6F, an edge guideline is also displayed. In this case, the edge guideline shows the location of any strong edges in the preview of the scene. In this case, the edges are determined by analyzing the image data to perform edge detection and parametrizing the position of the edge.

Of course, the user interfaces depicted in FIGS. 6A to 6F are merely examples, and other graphical representations may also be used for the user interface.

In step S414, it is determined whether the adjustments to the current transition 281 of the capture parameter are complete. If the current transition 281 is adjusted by image capture device 100, image capture device 100 determines when it is finished adjusting. If the current transition 281 is adjusted by the user, the user indicates completion via the user interface. If it is determined that the adjustment is not complete ("NO" in step S414), the flow returns to step S413 in which further adjustment of the transition 281 is accepted.

If it is determined that the adjustment is complete ("YES" in step S414), the flow proceeds to step S415 in which a revised capture parameter is calculated for tunable image sensor 14, by revising the default capture parameter based on the capture parameter adjusted in step S408 and the transition 281 of the capture parameter adjusted in step S413.

Generally, the revised capture parameter is computed based on the original parameters for the designated ROI, the exposure settings of image capture device, and the adjusted values of the capture parameter for the ROI which are calculated based on the adjustment of the capture parameters in step S408 and adjustment of the current transition 281 in step S413.

More specifically, in the case that the targeted imaging property is a target range for brightness, computing the revised capture parameter for the spectral responsivity of the tunable image sensor 14 comprises revising the default capture parameter based on the target range for brightness for the ROI together with the adjusted transition of the brightness value at a boundary between regions. In this case, the default capture parameter is revised by computing a brightness change parameter based on a comparison of original brightness values in the preview image data with the target range of brightness for the ROI and the adjusted transition of the brightness value at a boundary between regions, and combining the brightness change parameter with the default capture parameter so as to compute the revised capture parameter. In particular, computing the brightness change parameter comprises calculating a difference between the original brightness values in the preview image data and the target range of brightness for the ROI together with the adjusted transition of the brightness value at a boundary between regions. In this case, the revised capture parameter comprising the electronic spatial mask is generated by associating the brightness change parameters with bias voltages for the electronic spatial mask.

In the case that the targeted imaging property is a target range for color balance, computing the revised capture parameter for the spectral responsivity of the tunable image sensor 14 comprises revising the default capture parameter based on the target range for color balance for the ROI together with the adjusted transition of the color channel values at a boundary between regions. In this case, the default capture parameter is revised by computing color change parameters based on a comparison of original color channel values in the preview image data with the target color balance for the ROI and the adjusted transition of the color channel values at a boundary between regions, and combining the color change parameters with the default capture parameter so as to compute the revised capture parameter. In particular, computing the color change parameters comprises calculating a difference between the original color channel values in the preview image data and the target color balance for the ROI together with the adjusted transition of the color channel values at a boundary between regions. In this case, the revised capture parameter comprising the electronic spatial mask is generated by associating the color change parameters with bias voltages for the electronic spatial mask.

In step S416, the image capturing spatial mask setting module 310 applies the revised capture parameter to the tunable image sensor 14 for setting the spectral response of the tunable image sensor 14 to the revised setting. At this time, in some example embodiments, another preview image is captured in step S418 using the tunable image sensor 14 tuned in accordance with the revised capture parameter calculated in step S415. In this case, the flow returns to step S412 in which the user interface again displays the transition 281 of the capture parameter. At this time, the user may further adjust the transition 281 of the capture parameter in step S413, without re-designating ROIs.

In step S417, image capturing module 320 captures image data using the revised capture parameter, and stores the image data. At this time, it is also determined whether one capture or multiple captures is required in order to capture the image with the adjusted capture parameters. More specifically, system controller 50 obtains the original or default exposure values and imaging properties that are stored within the memory 52 of the image capture device 100. The system controller 50 also obtains the adjusted values of the imaging properties as adjusted for each region of interest and for the transition 281 between the regions. Then, system controller 50 calculates the difference between the two values.

Based on the difference between the adjusted values and the original imaging property values, the system controller 50 determines whether the image capture device 100 can capture the image with one shot. If the system controller 50 determines that one shot is sufficient, the image is captured and written onto the recording medium 200. If the system controller 50 determines that one shot is not sufficient, the image is captured with multiple shots. Capturing the image with multiple shots allows for exposure bracketing with appropriate exposure values and different color balance adjustments.

By virtue of this arrangement, the user typically adjusts imaging properties for the transition between regions of interest, rather than globally. Furthermore, the user previews the image and adjusts the imaging properties of transitions 281 at the boundary between regions to achieve substantially correct or aesthetically desired color balancing, before the image data for the captured image is written onto the recording medium 200.

Figure 7:
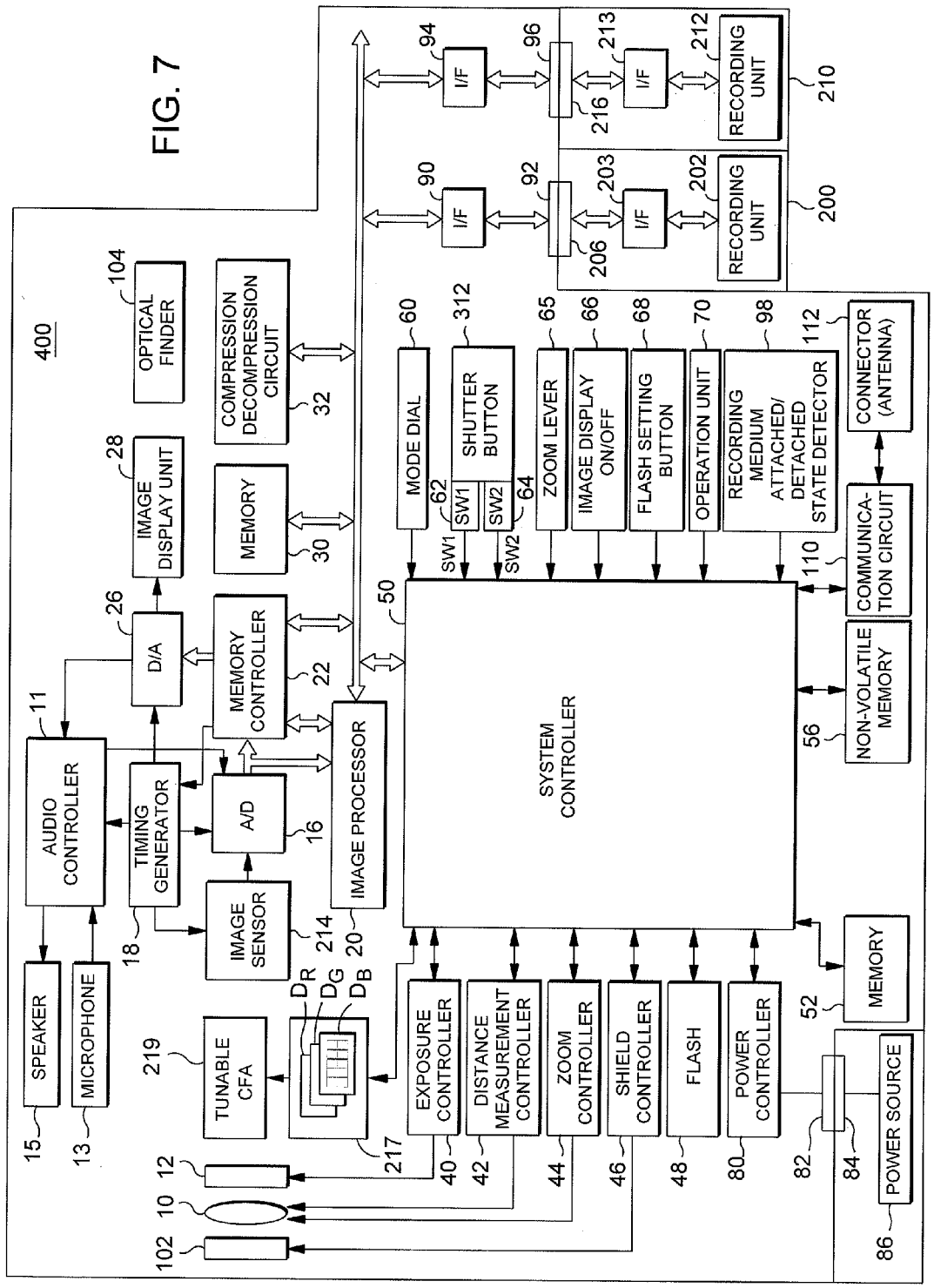
FIG. 7 is a detailed block diagram for explaining the internal architecture of an image capture device according to one example embodiment.

<FIGS. 7 and 8>

FIG. 7 is a detailed block diagram for explaining the internal architecture of an image capture device 400 according to a second example embodiment. In the embodiment of FIG. 7, parts and features that are largely similar to those of the example embodiment of FIG. 2A are illustrated with like reference numerals, and a detailed explanation thereof is omitted in the interest of brevity.

One way that the embodiment of FIG. 7 differs from the embodiment of FIG. 2A concerns the construction of the tunable imaging assembly. In the embodiment of FIG. 2A, the tunable imaging assembly includes tunable image sensor 14, perhaps in combination with optics such as lens 10. Because the image sensor 14 in the embodiment of FIG. 2A itself has a tunable spectral response, it is customary to omit a preceding color filter array, since the inclusion of any filter necessarily would decrease the signal-to-noise ratio by filtering the amount of light incident on image sensor 14.

In contrast, in the embodiment of FIG. 7, the spectral responsivity of image sensor 214 is not necessarily tunable, but rather the spectral responsivity of a preceding color filter array 219 is. Thus, in the example embodiment of FIG. 7, the tunable imaging assembly includes tunable color filter array (CFA) 219 and image sensor 214, perhaps in combination with optics such as lens 10. In the embodiment of FIG. 7, image sensor 214 is not necessarily tunable, although in other embodiments it might be.

Turning more specifically to the embodiment of FIG. 7, a light beam (light beam incident upon the angle of view of the lens) from an object in a scene that goes through the optical system (image sensing lens) 10 passes through an opening of a shutter 12 having a diaphragm function, is filtered by tunable color filter array 219, and forms an optical image of the object on the image sensing surface of image sensor 214. The image sensor 214 converts the optical image to analog image signals and outputs the signals to an A/D converter 16. The A/D converter 16 converts the analog image signal to digital image signals (image data).

In FIG. 7, an imaging assembly is comprised of tunable color filter array 219 and image sensor 214 together with associated optics, such that in some embodiments the imaging assembly is comprised of image sensor 214 preceded by color filter array 219 and lens 10.

Tunable color filter array 219 may be a spatial color filter array, such as a color filter array having a spatial distribution of a repeating pattern of filter elements. In this case, image data output from image sensor 214 is demosaiced, so as to result in output of a red-like channel for each pixel, a green-like channel for each pixel, and a blue-light channel for each pixel. Alternatively, tunable color filter array 219 might be a temporal color filter array, in which case the color filter quickly and sequentially changes spectral responsivity, with image data collected by image sensor 214 after each change. In this case, the sequential outputs of image sensor 214 are collected so as to result in output signals for each pixel for a red-like channel, a green-like channel, and a blue-light channel.

The spectral responsivity of tunable color filter array 219 is tunable in accordance with a capture parameter 217. In this embodiment, capture parameter 217 may be comprised of multiple spatial masks, with one mask for each channel of information output by image sensor 214, namely, the aforementioned red-like channel, green-like channel, and blue-light channel. Thus, in this example where image sensor 214 outputs three or more channels, capture parameters 217 include a spatial mask DR for the red-like channel of information, a spatial mask DG for the green-like channel of information, and a spatial mask DB for the blue-light channel of information. Each spatial mask comprises an array of control parameters applied to the tunable color filter array 219 in correspondence to pixels or regions of pixels in image sensor 214. The resulting spectral responsivity of each pixel, or each region of plural pixels, is thus tunable individually and independently of other pixels or regions of pixels, by virtue of the capture parameter 217 imposed on tunable color filter array 219.

Tunable color filter array 219 may be comprised of a tunable color filter array as described in U.S. Pat. No. 6,466,961 by Miller, mentioned hereinabove. Spatial masks DR, DG and DB may correspond to voltage biases applied to control electrodes of the tunable color filter array 219.

Figure 8A:
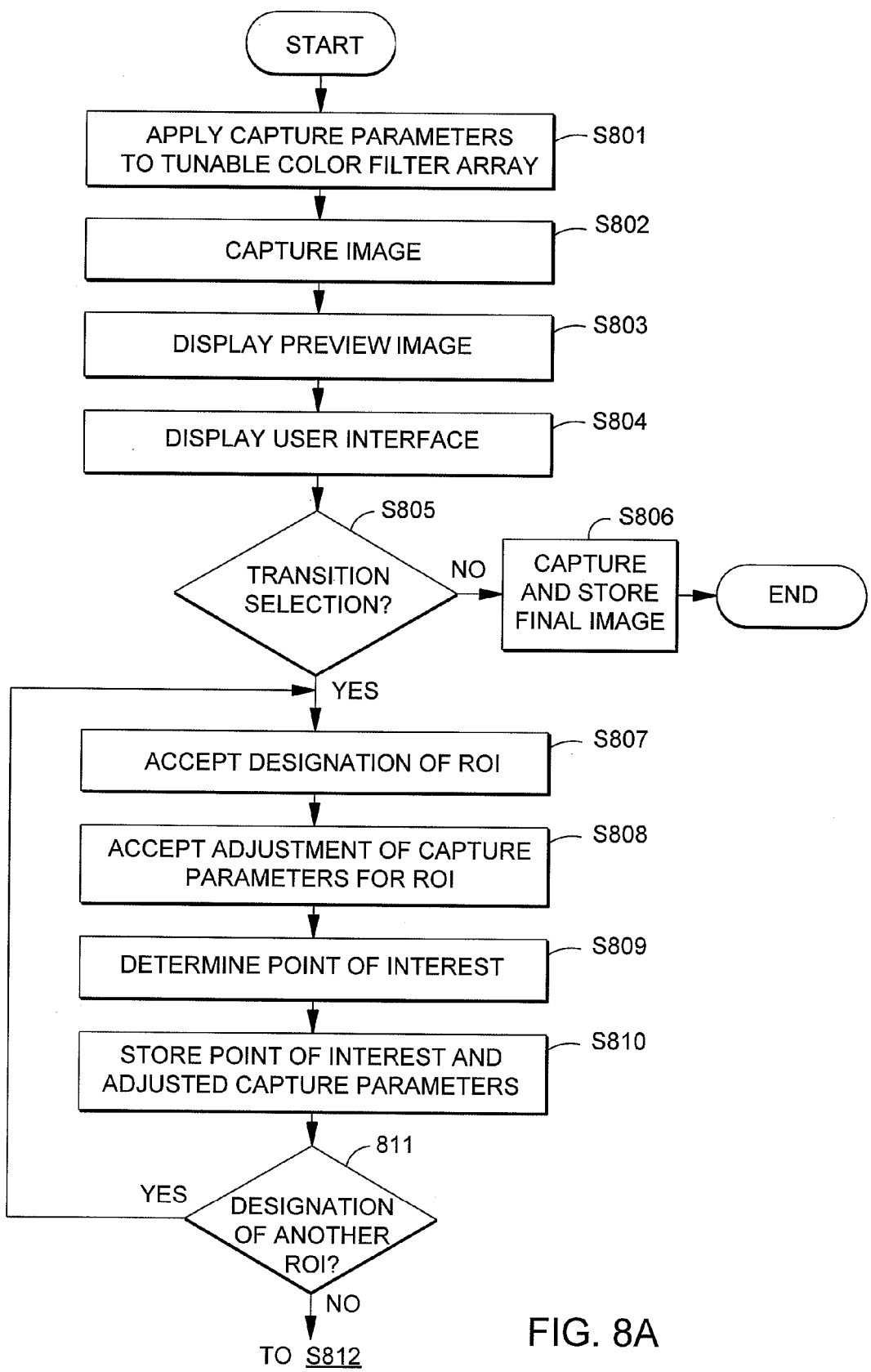
FIGS. 8A and 8B are flow diagrams for explaining processing in the image capture device shown in FIG. 7 according to one example embodiment.
Figure 8B:
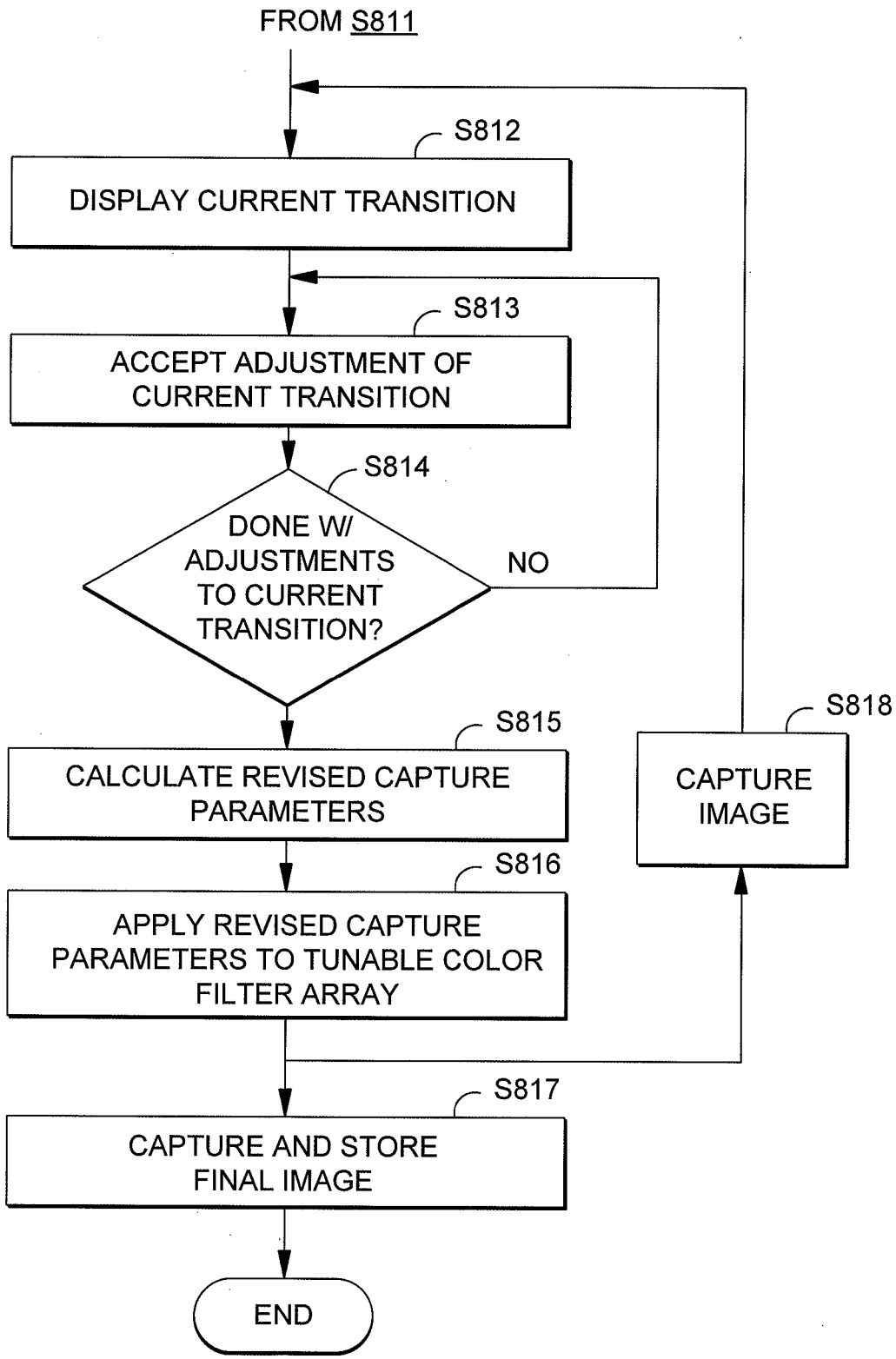

FIGS. 8A and 8B are flow diagrams for explaining processing in the image capture device shown in FIG. 1 according to one example embodiment. Briefly, according to FIGS. 8A and 8B, an image of a scene is captured by using an imaging assembly having spectral sensitivities which are tunable in accordance with a capture parameter. A first capture parameter is applied to the imaging assembly in a first region of the scene. A second capture parameter is applied to the imaging assembly in a second region of the scene. The image of the scene is captured by using the imaging assembly whose spectral response is tuned in accordance with the first capture parameter in the first region of the scene and in accordance with the second capture parameter in the second region of the scene. A preview of the captured image of the scene is displayed, wherein the scene is captured with a first capture parameter for the imaging assembly in a first region of the scene and a second capture parameter for the imaging assembly in a second region of the scene. A user interface to adjust a transition of the capture parameter at a boundary between the first region and the second region is displayed.

In more detail, the process shown in FIGS. 8A and 8B starts with application of a default capture parameter, then capturing an image using the default capture parameter. The image is captured and displayed on the image display unit 28 by a half stroke of shutter switch (SW1) 62 before the shutter switch (SW2) 64 is switched on by a full stroke of the shutter button by a user of the image capture device 400.

As shown in FIG. 8A, in step S801, a default capture parameter is applied to the tunable color filter array 219 for setting the spectral response of the tunable imaging assembly to a predesignated default setting. In this embodiment, the default capture parameter comprises an electronic spatial mask which individually tunes each pixel or each region of plural pixels in tunable color filter array 219.

In step S802, preview image data of a scene from the tunable color filter array 219 is captured using the default capture parameter, according to this example embodiment. In other example embodiments, image capture device 400 automatically determines a color balance for the preview image data, and automatically derives a capture parameter for the preview image data to be applied to color filter array 219. In this case, preview image data of a scene is captured using the capture parameter automatically derived by image capture device 400.

In step S803, a preview image based on the image data captured in step S802 is displayed, for example, as shown in FIG. 5A. In some embodiments, ranges for imaging properties of the preview image are also displayed, in addition to the preview image.

In step S804, a user interface including a selection of a transition mode is displayed, and a user selection of a transition mode is accepted. Transition mode allows the user to select ROIs and values of an imaging property for each ROI, as well as the values of the imaging property at the transition between the selected ROIs.

In step S805, it is determined whether transition mode is selected. If transition mode is not selected ("NO" in step S805), the flow proceeds to step S806 where a final image is captured using the default capture parameter and stored.

If transition mode is selected ("YES" in step S805), the flow proceeds to step S807 where designation of a ROI is accepted. As previously noted, the ROI may be designated by the user or automatically designated by image capture device 400.

In the case that the ROI is designated automatically by the image capture device 400, the image capture device 400 analyzes the image data of the preview image in order to identify the multiple regions of the scene in step S807. For example, image capture device 400 executes a spatial filtering algorithm to determine the edges of a ROI. Alternatively, the illumination of each pixel in the preview image is determined, and pixels having substantially the same illumination are determined to be included in a ROI. Of course, any other suitable algorithms for dividing the image into regions can also be used. In step S808, image capture device 400 calculates adjusted capture parameters for the ROI for application to the imaging assembly.

In the case that the user designates the ROI, the user designation of the ROI in the preview image is accepted at step S807, for example, as shown in FIG. 5B. In this embodiment, the ROI is designated by the user through an input via a button associated with the operation unit 70 which is then relayed to the system controller 50. In other embodiments, the user designates the ROI by contacting the region of the image displayed on the image display unit 28 where the image display unit 28 is a touch screen, or by voice command.

In this example embodiment, when the user designates the ROI in the preview image, the pixels of the image which are included in the ROI are determined. This determination may be made in a similar manner as discussed above with respect to automatic designation of the ROI, for example by using a spatial filtering algorithm or the illumination of each pixel. In other example embodiments, the preview image is divided into regions before acceptance of the user designation of the ROI. In this case, the user of the image capture device selects the quantity of regions to divide the displayed image. In some embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

In step S808, in the case that the user manually designates the ROI and selects the capture parameter for the ROI, a user selection of a targeted imaging property for the ROI is accepted, for example, as shown in FIGS. 5C to 5E. In the case that the targeted imaging property is a target range for brightness, a brightness range of the preview image data is displayed and a user manipulation of the brightness range is accepted so as to effect the selection of the target range for brightness for the ROI. In the case that the targeted imaging property is a target range for color balance, color channel ranges of the preview image data are displayed and a user manipulation of the color channel ranges is accepted so as to effect the selection of the target range for color balance for the ROI. With this arrangement, the user advantageously specifies the imaging property associated with a specific region of interest in the image displayed on the image display unit 28, rather than making a global adjustment to the entire image displayed on the image display unit 28. Furthermore, the user advantageously specifies the imaging property based on any suitable criteria, including, for example, a lookup table and/or aesthetic concerns.

After designation of ROI is accepted in step S807, by either automatic designation by image capture device 400 or user designation via the user interface, the point of interest within the ROI is determined in step S809, for example, by determining the pixel which is closest to the user's point of contact. Alternatively, the point of interest may be determined by using a centroid locating algorithm or by acceptance of user instruction. In step S810, the coordinates of the point of interest are stored together with the value of the adjusted capture parameter for the corresponding point of interest.

In step S811, it is determined whether a second ROI has been designated, either automatically by image capture device 400 or by user designation. If the second ROI has been designated ("YES" at step S811), the flow returns to step S807 where the designation of the second ROI is accepted. At this time, in some example embodiments, the user interface includes a preview image based on the image data captured with the adjusted capture parameter. An adjustment of the capture parameters for the second ROI is accepted in step S808, the point of interest for the second ROI is determined in step S809 and the coordinates of the point of interest are stored together with the values of the adjusted capture parameters in step S810.

If it is determined that a second ROI has not been designated ("NO" at step S811), the flow proceeds to step S812. As previously discussed, in this example embodiment, at least two ROIs are selected, together with imaging properties for each of the ROIs, so that the transition of the imaging properties at the boundary between the ROIs and across the transition zone can be adjusted.

In step S812, a user interface is displayed to adjust a transition of the capture parameter at a boundary between the first and second ROIs of the scene. In this example embodiment, the user interface includes an indication of a current transition for the capture parameter. In some example embodiments, the current transition comprises an automated transition which is calculated automatically based on scene elements in the first and second ROIs. Furthermore, the image capture device may interpolate the values of the imaging property at the boundary between regions in the scene, such that the transition between the regions is smooth.

In example embodiments, in step S812, a preview image is also displayed, wherein the preview image is captured using color filter array 219 tuned in accordance with the capture parameter adjusted in step S808. Thus, the preview image is based on image data captured with a first capture parameter for the imaging assembly in the first region of the scene and a second capture parameter for the second region of the scene.

In step S813, adjustment of the current transition for the capture parameter is accepted. According to some example embodiments, the user interface includes an interface to select between an automated transition calculated automatically by image capture device 400 for the transition of the capture parameter at the boundary between the first and second ROIs, and a manual adjustment of the transition of the capture parameter at the boundary between the first and second ROIs.

In the case that the transition of the capture parameter is adjusted manually, the user adjusts the transition by dragging points on the transition curve between the points of interest. The points on the transition curve can be adjusted by single or multiple contact with the user interface or touch screen, by eye gazing, by voice command, or by any other means. In the case that the transition of the capture parameter is adjusted by image capture device 400, the transition of the capture parameter is automatically adjusted by the image capture device 400 based on scene elements in the designated ROIs.

At this time, in some example embodiments, a preview image is also displayed, wherein the preview image is captured using color filter array 219 tuned in accordance with the capture parameter adjusted in step S808 and tuned in accordance with the transition of the capture parameter adjusted in step S813.

In step S814, it is determined whether the adjustments to the current transition of the capture parameter are complete. If the current transition is adjusted by image capture device 400, image capture device 400 determines when it is finished adjusting. If the current transition is adjusted by the user, the user indicates completion via the user interface. If it is determined that the adjustment is not complete ("NO" in step S814), the flow returns to step S813 in which further adjustment of the current transition is accepted.

If it is determined that the adjustment is complete ("YES" in step S814), the flow proceeds to step S815 in which a revised capture parameter for the transition between the designated ROIs is calculated for tunable color filter array 219, by revising the default capture parameter based on the capture parameter adjusted in step S808 and the transition of the capture parameter adjusted in step S813.

Generally, the revised capture parameter is computed based on the original parameters for the designated ROI, the exposure settings of image capture device, and the adjusted values of the capture parameter for the ROI which are calculated from the adjustment of the capture parameters in step S808 and adjustment of the current transition in step S813.

More specifically, in the case that the targeted imaging property is a target range for brightness, computing the revised capture parameter for the spectral responsivity of the tunable color filter array 219 comprises revising the default capture parameter based on the target range for brightness for the ROI together with the adjusted transition of the brightness value at a boundary between regions. In this case, the default capture parameter is revised by computing a brightness change parameter based on a comparison of original brightness values in the preview image data with the target range of brightness for the ROI and the adjusted transition of the brightness value at a boundary between regions, and combining the brightness change parameter with the default capture parameter so as to compute the revised capture parameter. In particular, computing the brightness change parameter comprises calculating a difference between the original brightness values in the preview image data and the target range of brightness for the ROI together with the adjusted transition of the brightness value at a boundary between regions. In this case, the revised capture parameter comprising the electronic spatial mask is generated by associating the brightness change parameters with bias voltages for the electronic spatial mask.

In the case that the targeted imaging property is a target range for color balance, computing the revised capture parameter for the spectral responsivity of the tunable color filter array 219 comprises revising the default capture parameter based on the target range for color balance for the ROI together with the adjusted transition of the color channel values at a boundary between regions. In this case, the default capture parameter is revised by computing color change parameters based on a comparison of original color channel values in the preview image data with the target color balance for the ROI and the adjusted transition of the color channel values at a boundary between regions, and combining the color change parameters with the default capture parameter so as to compute the revised capture parameter. In particular, computing the color change parameters comprises calculating a difference between the original color channel values in the preview image data and the target color balance for the ROI together with the adjusted transition of the color channel values at a boundary between regions. In this case, the revised capture parameter comprising the electronic spatial mask is generated by associating the color change parameters with bias voltages for the electronic spatial mask.

In step S816, the revised capture parameter is applied to the tunable color filter array 219 for setting the spectral response of the tunable color filter array 219 to the revised setting. At this time, in some example embodiments, another preview image is captured in step S818 using the tunable color filter array 214 tuned in accordance with the revised capture parameter calculated in step S815. In this case, the flow returns to step S812 in which the user interface again displays the transition of the capture parameter. At this time, the user may further adjust the transition of the capture parameter in step S813, without re-designating ROIs.

In step S817, image data is captured using the revised capture parameter, and the image data stored. At this time, it is also determined whether one capture or multiple captures is required in order to capture the image with the adjusted capture parameters. More specifically, system controller 50 obtains the original or default exposure values and imaging properties that are stored within the memory 52 of the image capture device 400. The system controller 50 also obtains the adjusted values of the imaging properties as adjusted for each region of interest and for the transition between the regions. Then, system controller 50 calculates the difference between the two values.

Based on the difference between the adjusted values and the original imaging property values, the system controller 50 determines whether the image capture device 400 can capture the image with one shot. If the system controller 50 determines that one shot is sufficient, the image is captured and written onto the recording medium 200. If the system controller 50 determines that one shot is not sufficient, the image is captured with multiple shots. Capturing the image with multiple shots allows for exposure bracketing with appropriate exposure values and different color balance adjustments.

By virtue of this arrangement, the user typically adjusts imaging properties for the transition between regions of interest, rather than globally. Furthermore, the user previews the image and adjusts the imaging properties of transitions at the boundary between regions to achieve substantially correct or aesthetically desired color balancing, before the image data for the captured image is written onto the recording medium 200.

<Other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An apparatus comprising:

an imaging assembly for capturing an image of a scene, wherein areas of the imaging assembly have respective spectral sensitivities which are tunable in terms of intensity and color in accordance with respective capture parameters; and a display screen for displaying a user interface, wherein a user selects multiple regions of interest of the scene including a first region and a second region, wherein for each selected region of interest, a capture parameter corresponding to the region of interest of the scene is selected, including a first capture parameter and a second capture parameter, wherein the display screen is further constructed to display a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein in a case that a target imaging property is a target range for brightness, the capture parameter is revised by computing a brightness change parameter based on a comparison of original brightness values in the image with the target range of brightness for the selected regions and an adjusted transition of a brightness value at a boundary between regions, and combining the brightness change parameter with the capture parameter.

2. The apparatus according to claim 1, wherein a number of intermediate points for a transition that is smooth is relatively more than a number of points for a transition that is abrupt.

3. A method for capturing an image of a scene by using an imaging assembly, wherein areas of the imaging assembly have respective spectral sensitivities which are tunable in terms of intensity and color in accordance with respective capture parameters, the method comprising:

displaying a user interface, wherein a user selects multiple regions of interest of the scene including a first region and a second region;

selecting, for each selected region of interest, a capture parameter corresponding to the region of interest of the scene, including a first capture parameter and a second capture parameter; and displaying a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein in a case that a target imaging property is a target range for brightness, the capture parameter is revised by computing a brightness change parameter based on a comparison of original brightness values in the image with the target range of brightness for the selected regions and an adjusted transition of a brightness value at a boundary between regions, and combining the brightness change parameter with the capture parameter.

4. A control module for use with an imaging assembly, wherein the imaging assembly captures an image of a scene, and wherein areas of the imaging assembly have respective spectral sensitivities which are tunable in terms of intensity and color in accordance with respective capture parameters, the control module comprising:

a user interface module constructed to display a user interface, wherein a user selects multiple regions of interest of the scene including a first region and a second region, wherein for each selected region of interest, a capture parameter corresponding to the region of interest of the scene is selected, including a first capture parameter and a second capture parameter, wherein the user interface module is further constructed to display a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein in a case that a target imaging property is a target range for brightness, the capture parameter is revised by computing a brightness change parameter based on a comparison of original brightness values in the image with the target range of brightness for the selected regions and an adjusted transition of a brightness value at a boundary between regions, and combining the brightness change parameter with the capture parameter.

5. An apparatus comprising:

an imaging assembly for capturing an image of a scene, wherein areas of the imaging assembly have respective spectral sensitivities which are tunable in terms of intensity and color in accordance with respective capture parameters; and a display screen for displaying a user interface, wherein a user selects multiple regions of interest of the scene including a first region and a second region, wherein for each selected region of interest, a capture parameter corresponding to the region of interest of the scene is selected, including a first capture parameter and a second capture parameter, wherein the display screen is further constructed to display a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein in a case a target imaging property is a target range for color balance, the capture parameter is revised by computing color change parameters based on a comparison of original color channel values in the image with the target range for color balance for the selected regions and an adjusted transition of color channel values at a boundary between regions, and combining the color change parameters with the capture parameter.

6. A method for capturing an image of a scene by using an imaging assembly, wherein areas of the imaging assembly have respective spectral sensitivities which are tunable in terms of intensity and color in accordance with respective capture parameters, the method comprising:

displaying a user interface, wherein a user selects multiple regions of interest of the scene including a first region and a second region;

selecting, for each selected region of interest, a capture parameter corresponding to the region of interest of the scene, including a first capture parameter and a second capture parameter; and displaying a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein in a case a target imaging property is a target range for color balance, the capture parameter is revised by computing color change parameters based on a comparison of original color channel values in the image with the target range for color balance for the selected regions and an adjusted transition of color channel values at a boundary between regions, and combining the color change parameters with the capture parameter.

7. A control module for use with an imaging assembly, wherein the image assembly captures an image of a scene, and wherein areas of the imaging assembly have respective spectral sensitivities which are tunable in terms of intensity and color in accordance with respective capture parameters, the control module comprising:

a user interface module constructed to display a user interface, wherein a user selects multiple regions of interest of the scene including a first region and a second region, wherein for each selected region of interest, a capture parameter corresponding to the region of interest of the scene is selected, including a first capture parameter and a second capture parameter, wherein the user interface module is further constructed to display a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein in a case a target imaging property is a target range for color balance, the capture parameter is revised by computing color change parameters based on a comparison of original color channel values in the image with the target range for color balance for the selected regions and an adjusted transition of color channel values at a boundary between regions, and combining the color change parameters with the capture parameter.

8. An apparatus comprising:

an imaging assembly for capturing an image of a scene, wherein areas of the imaging assembly have respective spectral sensitivities which are tunable in terms of intensity and color in accordance with respective capture parameters; and a display screen for displaying a user interface, wherein a user selects multiple regions of interest of the scene including a first region and a second region, wherein for each selected region of interest, a capture parameter corresponding to the region of interest of the scene is selected, including a first capture parameter and a second capture parameter, wherein the display screen is further constructed to display a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein a controller is constructed to obtain original values of imaging properties and adjusted values of imaging properties as adjusted for each region of interest and as adjusted for the transition between the regions, then calculates a difference between the two values and determines whether the imaging assembly can capture the image with one shot.

9. The apparatus according to claim 8, wherein if the controller determines that one shot is sufficient, the image is captured with one shot, and wherein if the controller determines that one shot is not sufficient, the image is captured with multiple shots.

10. The apparatus according to claim 9, wherein the controller is further configured to determine whether one shot or multiple shots is required in order to capture the image with the adjusted capture parameters.

11. A method for capturing an image of a scene by using an imaging assembly, wherein areas of the imaging assembly have respective spectral sensitivities which are tunable in terms of intensity and color in accordance with respective capture parameters, the method comprising:

displaying a user interface, wherein a user selects multiple regions of interest of the scene including a first region and a second region;

selecting, for each selected region of interest, a capture parameter corresponding to the region of interest of the scene, including a first capture parameter and a second capture parameter; and displaying a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, wherein a controller is constructed to obtain original values of imaging properties and adjusted values of imaging properties as adjusted for each region of interest and as adjusted for the transition between the regions, then calculates a difference between the two values and determines whether the imaging assembly can capture the image with one shot.

12. A control module for use with an imaging assembly, wherein the imaging assembly captures an image of a scene, and wherein areas of the imaging assembly have respective spectral sensitivities which are tunable in terms of intensity and color in accordance with respective capture parameters, the control module comprising:

a user interface module constructed to display a user interface, wherein a user selects multiple regions of interest of the scene including a first region and a second region, wherein for each selected region of interest, a capture parameter corresponding to the region of interest of the scene is selected, including a first capture parameter and a second capture parameter, wherein the user interface module is further constructed to display a user interface to adjust capture parameter transitions between the selected regions of interest by (a) adjusting respective values of capture parameters of areas of the tunable imaging assembly corresponding to a boundary, (b) accepting and determining respective points of interest within the selected regions of interest, (c) changing a transition of the capture parameter by adjusting a curve between the points of interest by adjusting intermediate points between the points of interest and without adjusting the values of the capture parameter for the points of interest, (d) revising the capture parameters based on the capture parameter adjusted and the transition of the capture parameter adjusted, (e) calculating spatial mask values to be applied to the tunable imaging assembly based on the revised capture parameters, and wherein a controller is constructed to obtain original values of imaging properties and adjusted values of imaging properties as adjusted for each region of interest and as adjusted for the transition between the regions, then calculates a difference between the two values and determines whether the imaging assembly can capture the image with one shot.

* * * * *